(12) United States Patent
Fujishiro et al.

(10) Patent No.: US 7,500,618 B2
(45) Date of Patent: Mar. 10, 2009

(54) VALVE DEVICE, PRESSURE REGULATOR, CARRIAGE, LIQUID EJECTING APPARATUS AND METHOD FOR MANUFACTURING VALVE DEVICE

(75) Inventors: Takeshi Fujishiro, Nagano-ken (JP); Osamu Takahashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 765 days.

(21) Appl. No.: 11/019,665

(22) Filed: Dec. 23, 2004

(65) Prior Publication Data

US 2005/0231563 A1    Oct. 20, 2005

(30) Foreign Application Priority Data

| Dec. 24, 2003 | (JP) | ............................. | 2003-428222 |
| Dec. 25, 2003 | (JP) | ............................. | 2003-431648 |
| Jan. 8, 2004 | (JP) | ............................. | 2004-003181 |
| Jan. 8, 2004 | (JP) | ............................. | 2004-003182 |
| Jun. 7, 2004 | (JP) | ............................. | 2004-168511 |

(51) Int. Cl.
*B05B 1/30* (2006.01)
*F16K 31/12* (2006.01)
*F16K 31/36* (2006.01)
*F16K 31/365* (2006.01)
*B41J 2/175* (2006.01)

(52) U.S. Cl. ........................... 239/91; 239/88; 239/569; 137/505.46; 347/85

(58) Field of Classification Search .................. 239/88, 239/89, 91, 95, 96, 569, 576, 589; 137/505.46, 137/505.47; 347/84–87
See application file for complete search history.

(56) References Cited

U.S. PATENT DOCUMENTS 4,630,641 A * 12/1986 Lacour .................. 137/505.38

FOREIGN PATENT DOCUMENTS

| JP | 9-193414 A | 7/1997 |
| JP | 2001-227656 A | 8/2001 |
| JP | 2003-251820 A | 9/2003 |
| JP | 2003-343757 A | 12/2003 |
| JP | 2004-142405 A | 5/2004 |
| WO | WO 03/041964 A1 | 5/2003 |

* cited by examiner

*Primary Examiner*—Darren W Gorman
(74) *Attorney, Agent, or Firm*—Sughrue Mion, PLLC

(57) ABSTRACT

A valve device has a pressure chamber, which is connected to a liquid inlet and a liquid outlet and retains liquid, and a pressure regulator decreasing the pressure in the pressure chamber to a predetermined level. The pressure regulator has a pressure receiving member. When the pressure in the pressure chamber becomes lower than the predetermined level, the pressure receiving member is elastically deformed in an inward direction of the pressure chamber. The pressure regulator generates actuation force greater than the pressing force produced by the elastic deformation of the pressure receiving member. The pressure regulator is configured to be opened by the actuation force. When the pressure regulator is open, a fluid supply from the liquid inlet to the pressure chamber is permitted. It is thus possible to minimize the valve device.

36 Claims, 23 Drawing Sheets

VALVE DEVICE, PRESSURE REGULATOR, CARRIAGE, LIQUID EJECTING APPARATUS AND METHOD FOR MANUFACTURING VALVE DEVICE

BACKGROUND OF THE INVENTION

The present invention relates to valve devices having pressure regulators, pressure regulators, carriages, liquid ejecting apparatuses, and methods for manufacturing valve devices.

A pressure regulator disclosed in Japanese Laid-Open Patent Publication No. 2001-227656 is known as a pressure regulator for decreasing liquid pressure to a constant level.

As a conventional inkjet type printer, a type in which ink is supplied from an ink cartridge to a pressure damper, which is installed in a carriage, through an ink supply tube is known (for example, see Japanese Laid-Open Patent Publication No. 2003-343757). The ink is then sent from the pressure damper to a recording head, such that printing is performed. If a relatively large amount of ink is retained in the ink cartridge, the carriage carrying the ink cartridge becomes relatively heavy. The weight causes excessive load to a drive motor for the carriage. Thus, the aforementioned printer is formed as a so-called off-carriage type in which the ink cartridge is not installed in the carriage. The pressure damper, which is provided in the carriage, suppresses variation of the ink pressure caused by reciprocal movement of the carriage.

As another conventional inkjet type printer, a type having a sub-reservoir, which is installed in the carriage for supplying ink to the recording head, is known (for example, see Japanese Laid-Open Patent Publication NO. 2003-251820). The sub-reservoir temporarily retains ink. A main reservoir serving as an ink cartridge is provided in a cartridge holder arranged in the printer body. The main reservoir supplies ink to the sub reservoir through an ink supply tube.

However, in the conventional pressure regulator of the publication No. 2001-227656, a central portion of a circular diaphragm and a valve body are connected to each other by means of a shaft. In other words, a valve shaft is located at the central portion of the diaphragm. Therefore, the valve body is pressed by the central portion of the diaphragm. The force for pressing the valve body is thus restricted to the level corresponding to the surface area of the diaphragm. That is, the force exceeding the level corresponding to the pressure receiving area of the diaphragm cannot be produced. This makes it difficult to minimize the pressure regulator.

Further, a pressure receiving portion of the pressure regulator is formed by the circular diaphragm. Thus, when the pressure regulators are employed in a multiple number, loss of the surface area (ineffective surface area) becomes relatively large. It is thus difficult to employ the pressure regulators in a highly integrated manner.

If the aforementioned pressure regulator is deployed in the carriage of the conventional inkjet type printer of the aforementioned corresponding documents such that the ink pressure in a pressure chamber, which retains ink, is decreased to a predetermined level, the carriage must have a relatively large thickness. Therefore, the printer as a whole may become relatively large.

SUMMARY OF THE INVENTION

Accordingly, it is an objective of the present invention to provide a valve device, a pressure regulator, a carriage, a liquid ejecting apparatus that can be minimized, and a manufacture method of such valve device.

To achieve the foregoing objectives of the present invention, the invention provides a valve device. The valve device has a pressure chamber connected to a liquid inlet and a liquid outlet for retaining liquid and a pressure regulator decreasing the pressure in the pressure chamber to a predetermined level. The pressure regulator has a pressure receiving member. The pressure receiving member is elastically deformed in an inward direction of the pressure chamber when the pressure in the pressure chamber becomes lower than the predetermined level. The pressure regulator generates actuation force greater than pressing force produced by the elastic deformation of the pressure receiving member. The pressure regulator is configured to be opened by the actuation force. A fluid supply from the liquid inlet to the pressure chamber is permitted when the pressure regulator is opened.

Another aspect of the present invention is a pressure regulator. The pressure regulator decreases a pressure in a pressure chamber, which retains liquid flowing from an inlet port and sends the liquid to an outlet port, to a predetermined level. A valve body is moved reciprocally between a closed position for blocking a liquid supply to the pressure chamber and an open position for permitting the liquid supply to the pressure chamber. The valve body is located at the closed position when the pressure in the pressure chamber exceeds the predetermined level. A deforming portion is deformed in correspondence with the pressure in the pressure chamber. The deforming portion moves the valve body from the closed position to the open position when the pressure in the pressure chamber is decreased to the predetermined level. A seal portion tightly contacts the valve body and an outer circumferential portion of the inlet port for sealing the inlet port when the valve body is located at the closed position. A holding portion urges the valve body toward the closed position at a position closer to the axis of the inlet port than the seal portion. The holding portion holds the valve body at the closed position when the pressure in the pressure chamber exceeds the predetermined level.

Another aspect of the present invention is a carriage. The carriage includes a pressure chamber that retains liquid introduced from an inlet port and sends the liquid to an outlet port. A pressure regulator decreases the pressure in the pressure chamber to a predetermined level. A liquid ejection head ejects the liquid supplied from the pressure chamber. The pressure regulator includes a valve body, a deforming portion, a seal portion, and a holding portion.

Another aspect of the present invention is a carriage having a pressure chamber connected to a liquid inlet and a liquid outlet for retaining liquid. The carriage includes a pressure regulator for decreasing the pressure of the liquid in the pressure chamber to a predetermined level and a liquid ejection head. The pressure regulator has a pressure receiving member. The pressure receiving member generates actuation force greater than pressing force produced by elastic deformation of the pressure receiving member. The pressure regulator is configured to be opened by the actuation force.

Another aspect of the present invention is a liquid ejecting apparatus. The liquid ejecting apparatus includes a liquid retaining portion for temporarily retaining liquid. A liquid ejection head has a nozzle for ejecting the liquid. A liquid supply line supplies the liquid from the liquid retaining portion to the liquid ejection head. A valve device is arranged in the liquid supply line. The valve device includes a pressure chamber connected to a liquid inlet and a liquid outlet for retaining the liquid. The liquid in the pressure chamber decreases in correspondence with liquid ejection by the liquid ejection head, thus lowering the pressure in the pressure chamber. A pressure regulator decreases the pressure of the liquid in the pressure chamber to a predetermined level. The pressure regulator detects the pressure in the pressure chamber and selectively blocks or permits a supply of the liquid from the liquid supply line to the pressure chamber. The pressure regulator has a pressure receiving member.

Another aspect of the present invention is a liquid ejecting apparatus having a carriage. The carriage includes a pressure chamber for retaining liquid introduced from an inlet port and sending the liquid to an outlet port, a pressure regulator, and a liquid ejection head. The pressure regulator includes a valve body, a deforming portion deformed in correspondence with the pressure in the pressure chamber, a seal portion for sealing the inlet port, and a holding portion.

Another aspect of the present invention is a method for manufacturing a valve device. The valve device includes a pressure chamber and a pressure regulator. The valve device has a passage defining member including a groove-like passage having an opening. The pressure regulator includes a valve body, a film member sealing the opening of the groove-like passage for defining the pressure chamber, and a pressing member. The film member is sufficiently thin for being elastically deformable due to a pressure change in the pressure chamber. The film member is secured to the passage defining member as held in a dome-like bent shape projecting outward from the pressure chamber. The film member is elastically deformed in an inward direction of the pressure chamber when the pressure in the pressure chamber becomes lower than the predetermined level. The manufacture method includes bending the film member in a dome-like shape through pressure molding using gas or liquid.

BRIEF DESCRIPTION OF THE DRAWINGS

The characteristics of the present invention that are believed to be novel will be made clear particularly by the attached claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
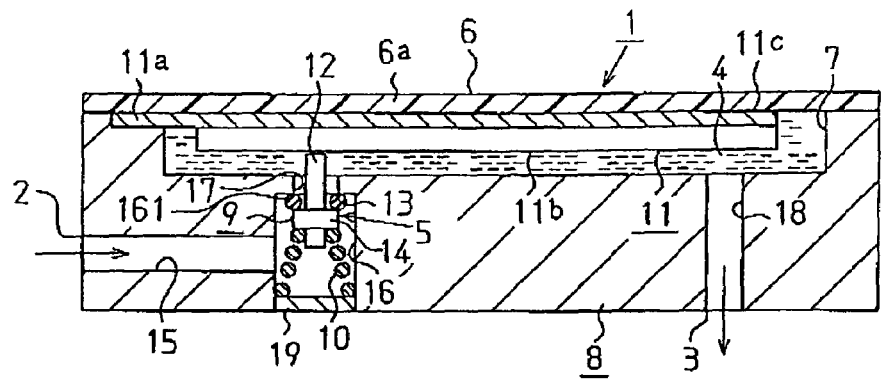
FIG. 1 is a cross-sectional view showing a valve device according to a first embodiment of the present invention, as taken along line A-A of FIG. 2.

Each of the embodiments of the present invention will be described in the following. In the description, similar reference numerals are given to similar components, and explanation thereof will not be repeated.

A valve device 1 according to a first embodiment of the present invention will be described with reference to FIGS. 1 to 3. As shown in FIG. 1, the valve device 1 includes a liquid inlet 2, a liquid outlet 3, a pressure chamber 4, and a pressure regulator 5. The pressure chamber 4 is connected to the liquid inlet 2 and the liquid outlet 3 and retains liquid such as ink. The pressure regulator 5 reduces the pressure of the liquid in the pressure chamber 4 to a predetermined level.

The pressure regulator 5 has a film member 6. When the pressure in the pressure chamber 4 becomes lower than the predetermined level (reaches a predetermined negative pressure), the film member 6 functions as a pressure receiving member elastically deformed in an inward direction of the pressure chamber 4 (downward as viewed in FIG. 1). When the pressure regulator 5 becomes open, the liquid is introduced from the liquid inlet 2 to the liquid outlet 3.

Figure 2:
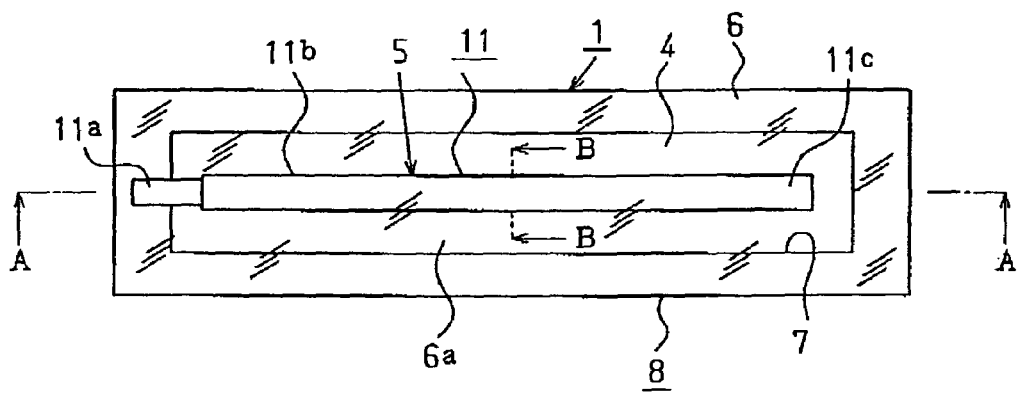
FIG. 2 is a plan view showing the valve device of FIG. 1.

As shown in FIGS. 1 and 2, the valve device includes a passage defining member 8. The pressure regulator 5 has a valve body 9, a pressure adjustment spring 10, an actuation lever 11, and the film member 6. The passage defining member 8 includes the liquid inlet 2, the liquid outlet 3, and a groove-like passage 7, which has a rectangular shape. The groove-like passage 7 is connected to the liquid inlet 2 and the liquid outlet 3. The actuation lever 11 functions as a pressing member for pressing the valve body 9 toward an open position against the urging force of the pressure adjustment spring 10. The film member 6 seals the groove-like passage 7 and thus defines the pressure chamber 4.

The film member 6 is formed of a material that does not scientifically affect the ink properties if the liquid is ink, and indicates a relatively low permeability for water, oxygen, and nitrogen. In other words, the film member 6 is configured by, for example, bonding and laminating a Nylon film coated with vinylidene chloride with a high density polyethylene film or a polypropylene film. The film member 6 is thermally deposited on the surface of the passage defining member 8, such that the opening of the groove-like passage 7 is sealed. That is, the film member 6 forms part of outer walls of the pressure chamber 4.

The valve body 9 is movable between the open position and a closed position (the position of FIG. 1). As located at the open position, the valve body 9 connects the liquid inlet 2 to the groove-like passage 7. At the closed position, the valve body 9 disconnects the liquid inlet 2 from the groove-like passage 7. The valve body 9 is urged toward the closed position by the pressure adjustment spring 10.

When the pressure in the pressure chamber 4 becomes lower than the predetermined level, the film member 6 is elastically deformed in an inward direction of the pressure chamber 4. The actuation lever 11 receives pressing force (elastic force) from the film member 6 held in the elastically deformed state. In this state, the actuation lever 11 transmits force greater than the aforementioned pressing force to the valve body 9, thus pressing the valve body 9 toward the open position.

In the valve device 1, an elongated rectangular portion of the film member 6 sealing the groove-like passage 7, or a portion of the film member 6 sealing the opening of the groove-like passage 7, corresponds to a pressure receiving portion 6a. The actuation lever 11 of the valve device 1 is arranged in the groove-like passage 7 and includes a supported end 11a and a distal end 11c. As viewed in FIG. 1, the supported end 11a corresponds to a left end of the actuation lever 11 and the distal end 11c corresponds to a right end of the actuation lever 11, which is an opposed end to the supported end 11a. The actuation lever 11 is formed as a cantilever in which the supported end 11a is supported by the passage defining member 8. The actuation lever 11 receives pressing force from the film member 6 over the portion from the supported end 11a to the distal end 11c. The valve body 9 is located such that the valve body 9 receives actuation force from a portion of the actuation lever 11 closer to the supported end 11a than the center of gravity of the actuation lever 11.

As long as the rigidity of the supported end 11a of the actuation lever 11 is sufficient for supporting the actuation lever 11, the supported end 11a meets the requirement regarding the rigidity. The actuation lever 11 includes the supported end 11a and the remaining portion other than the supported end 11a, which is a pressing portion 11b. Since the pressing portion 11b contacts and presses the valve body 9, it is preferred that the pressing portion 11b has a relatively high rigidity. Accordingly, the rigidity of the supported end 11a of the actuation lever 11 is set to a lower level than that of the pressing portion 11b. In the valve device 1 of the first embodiment, the actuation lever 11 is formed by a single thin plate. As shown in FIG. 3, the pressing portion 11b of the actuation lever 11 has a channel-like cross-sectional shape. By bending the pressing portion 11b, the rigidity of the pressing portion 11b becomes higher than that of the supported end 11a.

The valve body 9 of the valve device 1 includes a valve shaft 12, an annular seal portion 13, and a jaw 14 serving as a spring receiving portion. The seal portion 13 is formed by an O ring. The passage defining member 8 includes an inlet passage 15, a liquid supply chamber 16, a communication hole 17, and an outlet passage 18. The inlet passage 15 includes the liquid inlet 2. The liquid supply chamber 16 is connected to the inlet passage 15 and accommodates the valve body 9 and the pressure adjustment spring 10. The communication hole 17 has a circular shape and connects the liquid supply chamber 16 to the pressure chamber 4. The outlet passage 18 is connected to the pressure chamber 4 and includes the liquid outlet 3. The communication hole 17 functions as an inlet port and the outlet passage 18 functions as an outlet port.

An opening of the liquid supply chamber 16 is defined in a lower surface of the passage defining member 8. The pressure adjustment spring 10 is clamped between the jaw 14 of the valve body 9 and a holding member 19, which seals the opening of the liquid supply chamber 16. The valve shaft 12 is passed through the communication hole 17, such that a gap is defined between the valve shaft 12 and the circumferential surface of the communication hole 17. With the valve shaft 12 passed through the communication hole 17, the valve body 9 is urged toward the closed position by the pressure adjustment spring 10. The passage defining member 8 has a seal surface 161 formed at a position opposed to the valve body 9, or along an outer circumferential portion of the communication hole 17. When the valve body 9 is located at the open position, the seal portion 13 is pressed by the seal surface 161 in the liquid supply chamber 16.

In the valve device 1, if the liquid in the pressure chamber 4 is decreased and the pressure in the pressure chamber 4 becomes lower than the predetermined level, the pressure receiving portion 6a of the film member 6 is elastically deformed in an inward direction of the pressure chamber 4. The force thus generated by the film member 6 acts to press the actuation lever 11, or the cantilever, downward as viewed in FIG. 1. The actuation lever 11 then generates actuation force that is greater than the pressing force of the film member 6 due to a leverage effect, thus moving the valve shaft 12 of the valve body 9 from the closed position to the open position. In other words, the actuation lever 11 configures a leverage mechanism generating the actuation force by receiving the pressing force. That is, the actuation lever 11 configures a force amplification mechanism amplifying the elastic force to the actuation force. Accordingly, the pressure regulator 5 is switched to an open state, such that the liquid is supplied from the liquid inlet 2 to the pressure chamber 4. When the liquid in the pressure chamber 4 is increased and the pressure in the pressure chamber 4 reaches the predetermined level, the pressure receiving portion 6a of the film member 6 restores its original shape, recovering from the elastically deformed shape. As a result, the valve body 9 is returned from the open position to the closed position by the urging force of the pressure adjustment spring 10. The pressure regulator 5 thus returns to a closed state such that the liquid supply from the liquid inlet 2 to the pressure chamber 4 is blocked.

The valve device 1 of the first embodiment has the following advantages.

When the pressure in the pressure chamber 4 becomes lower than the predetermined level, the pressure regulator 5 is switched to the open state by the actuation force greater than the pressing force of the pressure receiving portion 6a of the film member 6. If the pressure in the pressure chamber 4 reaches the predetermined level, the pressure regulator 5 is returned to the closed state such that the pressure in the pressure chamber 4 is lowered to the predetermined level. More specifically, the actuation lever 11 produces the actuation force greater than the pressing force applied by the pressure receiving portion 6a of the film member 6. By the actuation force, the actuation lever 11 acts against "seal load" for opening the pressure regulator 5. The "seal load" is defined as the force maintaining the pressure regulator 5 in the closed state by pressing the seal portion 13 against the seal surface (a seat surface) 161. The seal load is generated by the pressure adjustment spring 10. In other words, the pressure regulator 5 gains the actuation force greater than the pressing force generated by the elastic deformation of the film member 6. The pressure regulator 5 is configured to be opened by such actuation force. This structure reduces the surface area of the pressure receiving portion 6a of the film member 6, thus making it possible to minimize the pressure regulator 5 and the valve device 1.

The pressure receiving portion 6a is formed by the elongated rectangular portion of the film member 6, which seals the groove-like passage 7. Thus, when multiple groove-like passages 7 are arranged in parallel such that a plurality of pressure regulators 5 are provided, loss of the surface area (ineffective surface area) becomes relatively small. It is thus possible to deploy the pressure regulators 5 in a highly integrated manner.

The components of the valve device 1 other than the valve body 9 and the pressure adjustment spring 10, including the film member 6 and the actuation lever 11, are formed as thin plates. This structure makes it possible to reduce the thickness of the pressure regulator 5 and that of the valve device 1 as a whole.

The valve body 9 is located such that the valve body 9 receives the actuation force from the actuation lever 11 at a position closer to the supported end 11a than the center of gravity of the actuation lever 11. The actuation lever 11 is thus allowed to move the valve body 9 to the open position by the force generated through amplification of the force received by the pressure receiving portion 6a of the film member 6, or, in other words, the force greater than the pressing force of the pressure receiving portion 6a. The center of gravity of the actuation lever 11 corresponds to a power point, the supported end 11a corresponds to a fulcrum, and the pressing portion 11b corresponds to an action point. This structure minimizes the surface area of the pressure receiving portion 6a, which is the elongated rectangular portion of the film member 6. It is thus possible to minimize the pressure regulator 5 as a whole and employ the pressure regulators 5 in a highly integrated manner.

As long as the rigidity of the supported end 11a, which functions as a supported point (the fulcrum) of the actuation lever 11, is sufficient for supporting the actuation lever 11, the supported end 11a meets the requirement regarding the rigidity. In contrast, since the pressing portion 11b of the actuation lever 11 presses the valve shaft 12 of the valve body 9, it is preferred that the pressing portion 11b has a relatively high rigidity. The rigidity of the supported end 11a of the actuation lever 11 is thus lower than that of the pressing portion 11b. This reduces moment produced by the supported end 11a of the actuation lever 11, suppressing adverse effects of the moment.

Since the actuation lever 11 is formed integrally from a single thin plate, positioning and handling of the actuation lever 11 are simplified. Since the pressing portion 11b of the actuation lever 11 is bent such that the pressing portion 11b has a channel-like cross-sectional shape, the pressing portion 11b has rigidity higher that that of the supported end 11a (a support portion), which has a flat shape.

When the valve shaft 12 is passed through the communication hole 17 with a gap defined between the valve shaft 12 and the circumferential surface of the communication hole 17, the valve body 9 is urged toward the open position by the pressure adjustment spring 10. In this state, the seal portion 13 is pressed against the seal surface 161 of the liquid supply chamber 16. It is thus unnecessary to provide a shaft support structure, which requires high component accuracy. Accordingly, assembly of the pressure regulator 5 is facilitated and the cost for the pressure regulator 5 is reduced.

A valve device 1A according to a second embodiment of the present invention will now be described with reference to FIG. 4. The valve device 1A has six pressure regulators $5_1$ to $5_6$. The valve device 1A may use different types of liquids, such as six colors of ink. The valve device 1A includes six groove-like passages $7_1$ to $7_6$ arranged in parallel, each of which retains a corresponding color of ink. A film member 6A is thermally deposited on the surface of a passage defining member 8 such that the openings of the groove-like passages $7_1$ to $7_6$ are sealed. This defines six pressure chambers $4_1$ to $4_6$. The film member 6A forms part of the pressure chambers $4_1$ to $4_6$. Rectangular portions of the film member 6A, each of which seals a corresponding one of the groove-like passages $7_1$ to $7_6$, or portions of the film member 6A sealing the openings of the groove-like passages $7_1$ to $7_6$, are pressure receiving portions $6a_1$ to $6a_6$.

In each of the groove-like passages $7_1$ to $7_6$, a corresponding one of actuation levers $11_1$ to $11_6$ is arranged. Each of the actuation levers $11_1$ to $11_6$ is formed by a cantilever in which a supported end $11a_1$ to $11a_6$ is supported by the passage defining member 8A.

The second embodiment has the following advantage, in addition to the advantages of the first embodiment.

The valve device 1A includes the six groove-like passages $7_1$ to $7_6$, which are arranged in parallel, and the six pressure regulators $5_1$ to $5_6$. This structure minimizes and reduces the thickness of the valve device 1A, which is used in a liquid ejecting apparatus such as an inkjet type printer.

A valve device 1B according to a third embodiment of the present invention will hereafter be explained with reference to FIGS. 5 to 7.

In the valve device 1B, a valve body 9B of a pressure regulator 5B is a substantially L-shaped (V-shaped) lever. The valve body 9B is arranged in the groove-like passage 7 and pivotally supported by the opposed walls of a passage defining member 8B. The valve body 9B has a first lever section 20 including the seal portion 13 and a second lever section 12 pressed by the pressing portion 11b of the actuation lever 11. The first lever section 20 is formed integrally with the second lever section 21. The seal portion 13 is secured to a front surface (in FIG. 5, the left side) of the first lever section 20.

Figure 6:
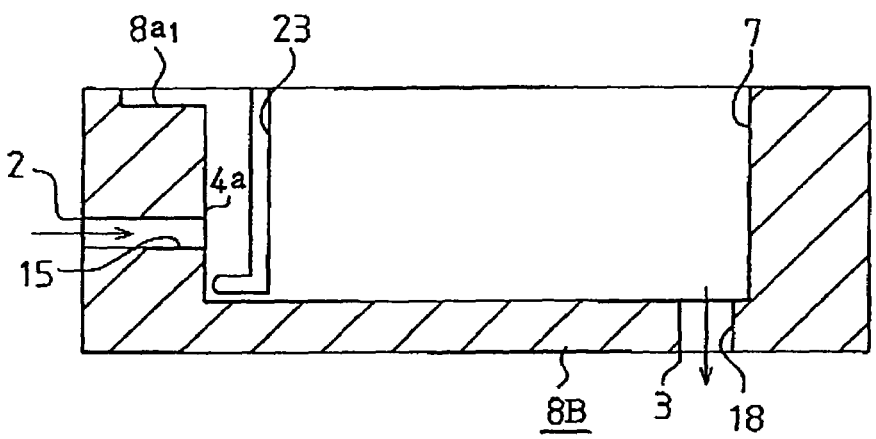
FIG. 6 is a cross-sectional view showing a passage defining member of the valve device of FIG. 5.
Figure 7:
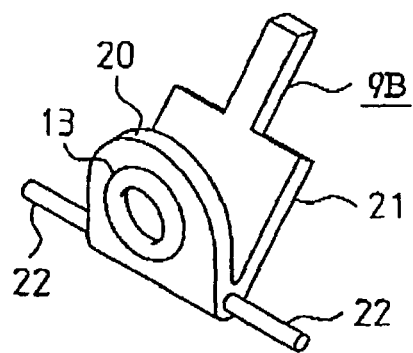
FIG. 7 is a perspective view showing a valve body of FIG. 5.

The valve body 9B, the substantially L-shaped lever, includes pins 22, 22 projecting from the opposing sides of the crossing portion between the first lever section 20 and the second lever section 21 (see FIG. 7). A guide groove 23 having a substantially L shape is defined in the inner surface of each of the opposing side walls of passage defining member 8B (see FIG. 6). A corresponding one of the pins 22, 22 is inserted into each of the guide grooves 23 to the position shown in FIG. 5. Each guide groove 23 rollably supports the corresponding pin 22.

The inlet passage 15 is defined in a side wall (a left wall) of the passage defining member 8B. The inlet passage 15 includes the liquid inlet 2 and is connected to the pressure chamber 4. The valve body 9B is urged by an L-shaped (V-shaped) plate spring 10B, which is arranged in the pressure chamber 4 as a pressure adjustment spring. The seal portion 13 is pressed against a seal surface 4a of the pressure chamber (an outer circumferential portion of the inlet passage 15). The remaining structure of the valve device 1B is the same as that of the valve device 1 of the first embodiment. In FIG. 6, a step 8a1 of the passage defining member 8 is illustrated. The supported end 11a of the actuation lever 11 is fixed to the step 8a1 by an adhesive or the like.

Figure 5:
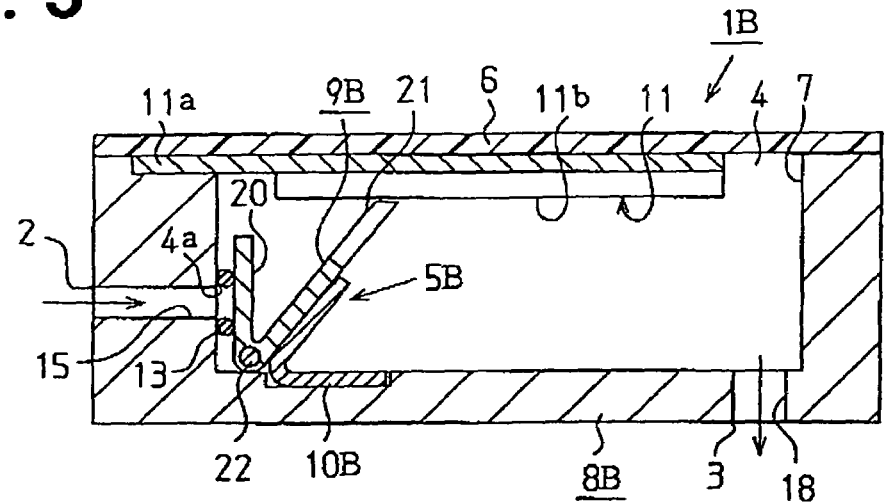
FIG. 5 is a cross-sectional view showing a valve device according to a third embodiment of the present invention.

In the valve device 1B, when the pressure in the pressure chamber 4 becomes lower than the predetermined level (reaches the predetermined negative pressure), the pressure receiving portion of the film member 6 (the pressure receiving portion 6a of the first embodiment, which is shown in FIG. 2) is elastically deformed in an inward direction of the pressure chamber 4, thus pressing the actuation lever 11, or the cantilever, in a downward direction of FIG. 5. The actuation lever 11 thus presses the second lever section 21 of the valve body 9B held in the closed state (the state of FIG. 5) in a downward direction by the actuation force greater than the pressing force of the pressure receiving portion 6a of the film member 6. In this manner, the valve body 9B pivots about the pins 22 toward the open position (in a clockwise direction of FIG. 5). The seal portion 13 is thus separated from the seal surface 4a of the pressure chamber 4, such that the pressure regulator 5B is switched to the open state. In this state, liquid is supplied from the liquid inlet 2 to the pressure chamber 4 through the inlet passage 15.

When the amount of the liquid in the pressure chamber 4 is increased and the pressure in the pressure chamber 4 reaches the predetermined level, the pressure receiving portion 6a of the film member 6 restores the original shape, recovering from the elastically deformed shape. Accordingly, the urging force of the plate spring 10B enables the valve body 9B to pivot about the pins 22 from the open position to the closed position (counterclockwise). This presses the seal portion 13 against the seal surface 4a of the pressure chamber 4, such that the pressure regulator 5B restores the closed state. The liquid supply from the liquid inlet 2 to the pressure chamber 4 is thus shuttered.

The third embodiment has the following advantages in addition to the advantages of the first embodiment.

The valve body 9B of the pressure regulator 5B is a substantially L shaped lever and is located at the closed position as urged by the plate spring 10B. The seal portion 13 is thus pressed against the seal surface 4a of the pressure chamber 4. Therefore, it is unnecessary to provide a shaft support structure, which requires relatively high component accuracy, in the valve body 9B. This makes it easy to assemble the pressure regulator 5B, thus saving the cost.

The plate spring 10B is received in the pressure chamber 4 of the passage defining member 8B. Since the passage defining member 8B must include only the pressure chamber 4 and the inlet passage 15 connected to the liquid inlet 2, the configuration of the passage defining member 8B is relatively simple. Further, it is unnecessary to provide a holding member for holding the plate spring 10B. This further facilitates assembly of the pressure regulator 5 and saves the cost.

A valve device 1C according to a fourth embodiment of the present invention will hereafter be described with reference to FIGS. 8 to 10.

In the valve device 1C, a valve body 9C of a pressure regulator 5C is formed by a substantially L-shaped lever arranged in the groove-like passage 7 and pivotally supported by the opposed walls of a passage defining member 8C. The valve body 9b has a first lever section 30 including the seal portion 13 and a second lever section 31 pressed by the pressing portion 11b of the actuation lever 11. The first lever section 30 is formed integrally with the second lever section 31. The seal portion 13 is secured to a front surface (in FIG. 8, a lower surface of the first lever section 30.

Figure 9:
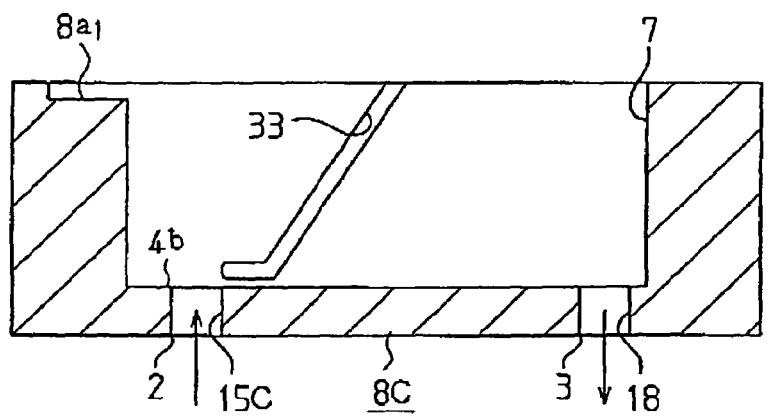
FIG. 9 is a cross-sectional view showing a passage defining member of the valve device of FIG. 8.
Figure 10:
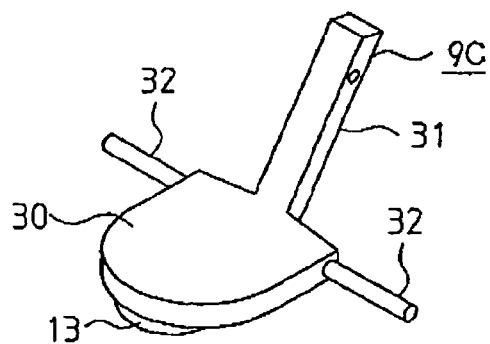
FIG. 10 is a perspective view showing a valve body of FIG. 8.

The valve body 9C includes pins 32, 32 projecting from the opposing sides of the crossing portion between the first lever section 30 and the second lever section 31 (see FIG. 10). A substantially L-shaped guide groove 33 is defined in the inner surface of each of the opposing side walls of the passage defining member 8C (see FIG. 9). A corresponding one of the pins 32, 32 is inserted into each of the guide grooves 33 to the position shown in FIG. 8. Each guide groove 33 rollably supports the corresponding pin 32 at an insert position.

An inlet passage 15C, which includes the liquid inlet 2 and is connected to the pressure chamber 4, and the outlet passage 18 are defined in the bottom of the passage defining member 8C. A pull spring 10C serving as a pressure adjustment spring is arranged in the pressure chamber 4. The left end of the pull spring 10C is secured to a corresponding side wall of the passage defining member 8C and the right end of the pull spring 10C is secured to the second lever section 31. The valve body 9C, the substantially L-shaped lever, is urged by the pull spring 10C toward a closed position at which the seal portion 13 is pressed against a seal surface 4b of the pressure chamber 4. The remaining structure of the valve device 1C is the same as that of the valve device 1 of the first embodiment.

Figure 8:
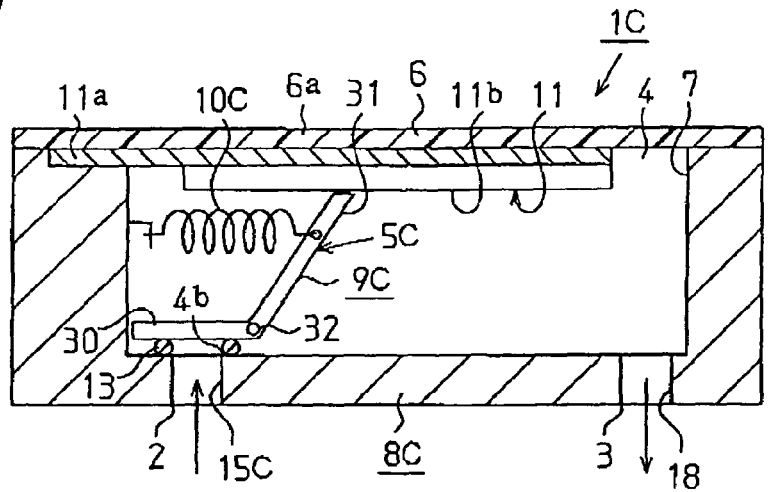
FIG. 8 is a cross-sectional view showing a valve device according to a fourth embodiment of the present invention.

In the valve device 1C, when the pressure in the pressure chamber 4 becomes lower than the predetermined level, the pressure receiving portion of the film member 6 (the pressure receiving portion 6a of the first embodiment, which is shown in FIG. 2) is elastically deformed in an inward direction of the pressure chamber 4, thus pressing the actuation lever 11 in a downward direction of FIG. 8. The actuation lever 11 thus presses the second lever section 31 of the valve body 9C held at the closed position in a downward direction by the actuation force greater than the pressing force of the pressure receiving portion 6a of the film member 6. In this manner, the valve body 9C pivots about the pins 32, 32 toward the open position (in a clockwise direction of FIG. 8). The seal portion 13 is thus separated from the seal surface 4b of the pressure chamber 4, such that the pressure regulator 5C is switched to the open state. In this state, liquid is supplied from the liquid inlet 2 to the pressure chamber 4 through the inlet passage 15C.

When the amount of the liquid in the pressure chamber 4 is increased and the pressure in the pressure chamber 4 reaches the predetermined level, the pressure receiving portion 6a of the film member 6 restores the original shape, recovering from the elastically deformed shape. Accordingly, the urging force of the pull spring 10C enables the valve body 9C to pivot about the pins 32 from the open position to the closed position (counterclockwise). This presses the seal portion 13 against the seal surface 4b of the pressure chamber 4, such that the pressure regulator 5C restores the closed state. The liquid supply from the liquid inlet 2 to the pressure chamber 4 is thus shuttered.

The fourth embodiment has the following advantage in addition to the advantages of the first embodiment.

For the same reasons as those explained about the third embodiment, assembly of the valve device 1C is further facilitated and the cost is further saved.

Figure 11:
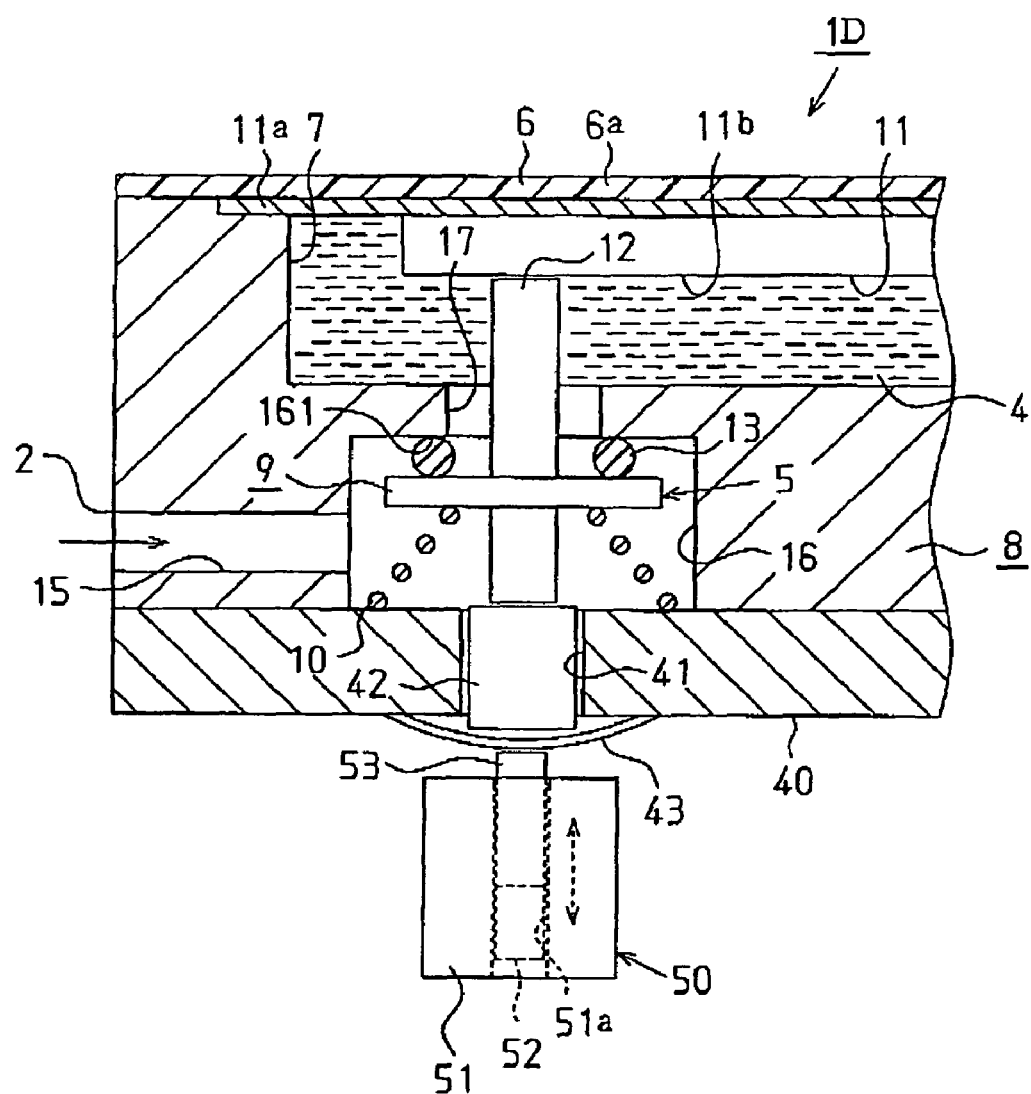
FIG. 11 is a cross-sectional view showing a valve device according to a fifth embodiment of the present invention.

A valve device 1D according to a fifth embodiment of the present invention will hereafter be explained referring to FIG. 11.

The valve device 1D is characterized in that the pressure regulator 5 of the first embodiment, which is shown in FIG. 1, functions as a choke valve. The "function as the choke valve" mentioned herein is defined as a function of forcibly maintaining the pressure regulator 5 at the closed position of FIG. 11, or forcibly shuttering communication between the liquid supply chamber 16 and the pressure chamber 4.

In the valve device 1D, a holding member 40 having a communication hole 41 is secured to a lower surface of the passage defining member 8, instead of the holding member 19 of the first embodiment. The communication hole 41 is located below the valve shaft 12 of the valve body 9. A movable pin 42 for selectively raising or lowering the valve shaft 12 is received in the communication hole 41 such that the pin 42 is allowed to move upward or downward. A lower section of the movable pin 42 is shielded by a seal film member 43 secured to a lower surface of the holding member 40 for sealing the opening of the communication hole 41. This structure prevents the movable pin 42 from falling from the communication hole 41 to the exterior (in a downward direction).

A pin actuator 50 is disposed below the pressure regulator 5 of the valve device 1D for moving the movable pin 42 between a choke position and a non-choke position (an area below the choke position). The movable pin 42 is raised to the choke position for forcibly holding the valve body 9 at the closed position of FIG. 11. In correspondence with the non-choke position, the valve body 9 is released from the forcible holding at the closed position.

The pin actuator 50 includes a cylindrical body 51, a piezoelectric element 52 received in a central hole 51a of the cylindrical body 51, and an actuation pin 53. When supplied with an AC voltage, for example, the piezoelectric element 52 is selectively extended or compressed such that the actuation pin 53 is correspondingly moved upward or downward. The actuation pin 53 is movable between a first position for moving the movable pin 42 to the choke position and a second position (the position of FIG. 11) lowered from the first position. When the actuation pin 53 is moved from the first position to the second position, the movable pin 42 is lowered from the choke position to the non-choke position due to the weight of the movable pin 42.

If the AC voltage supply is stopped (the power supply is turned off) with the actuation pin 53 held at the first position (with the movable pin 42 held at the choke position), the actuation pin 53 is maintained at the first position by friction force acting between the actuation pin 53 and the circumferential surface of the central hole 51a of the cylindrical body 51. In this manner, the movable pin 42 is maintained at the choke position.

In the valve device 1D, when an AC voltage is supplied to the piezoelectric element 52 with the actuation pin 53 held at the second position of FIG. 11, the piezoelectric element 52 is extended such that the actuation pin 53 is moved to the first position. This moves the movable pin 42 from the non-choke position to the choke position, thus enabling the movable pin 42 to forcibly hold the valve body 9 at the closed position of FIG. 11.

When the power is cut off with the movable pin 42 held at the choke position, the actuation pin 53 is maintained at the first position by the friction force between the actuation pin 53 and the circumferential surface of the cylindrical body 51. The movable pin 42 is thus maintained at the choke position.

If the AC voltage supply to the piezoelectric element 52 is resumed with the movable pin 42 held at the choke position, the piezoelectric element 52 is compressed such that the actuation pin 53 is moved from the first position to the second position. Accordingly, the movable pin 42 is lowered from the choke position to the non-choke position due to the weight of the movable pin 42. The valve body 9 is thus released from the forcible holding at the closed position.

The fifth embodiment has the following advantages.

Since the pressure regulator 5 functions as a choke valve, it is unnecessary to provide a choke valve separately from the pressure regulator 5, if the valve device 1D is deployed in a carriage of an inkjet type printer, for example. It is thus possible to provide an inkjet type printer having a choke valve function with a relatively small number of components and a relatively low cost.

The valve device 1D of the fifth embodiment may be applied to the second embodiment of FIG. 2, such that each of the six pressure regulators $5_1$ to $5_6$ functions as a choke valve. In this case, one or more of the pressure regulators $5_1$ to $5_6$ may be forcibly maintained at the closed position(s) for performing selective cleaning. In accordance with the "selective cleaning", selected one(s) of, for example, six colors of ink may be subjected to cleaning. More specifically, the movable pin(s) 42 of the pressure regulators $5_1$ to $5_6$ corresponding to the selected color(s) is(are) moved to the choke position(s). In this manner, the corresponding pressure regulator(s) $5_1$ to $5_6$ is(are) forcibly maintained at the closed position(s).

The above-described choke valve mechanism is a pin structure in which the pin actuator 50 actuates the actuation pin 53 for moving the movable pin 42 between the choke position and the non-choke position. Accordingly, the structure enabling the pressure regulator 5 to function as a choke valve can be provided in a relatively small space below the pressure regulator 5, which also is relatively small.

If the AC voltage supply to the piezoelectric element 52 is stopped with the movable pin 42 located at the choke position, the actuation pin 53 is held at the first position by the friction force between the actuation pin 53 and the circumferential surface of the cylindrical body 51. The movable pin 42 is thus maintained at the choke position. Thus, if the valve device ID is installed in a carriage of an inkjet type printer, the ink is prevented from leaking through a head of the carriage due to the position of the printer or the environment, even with the power of the printer turned off.

[Printer]

An example of a printer employing the valve devices 1 to 1D of the illustrated embodiments will be described with reference to FIGS. 12 and 13. More specifically, an inkjet type printer in which the valve device 1 of the first embodiment is provided in a carriage will be explained by way of example.

Figure 12:
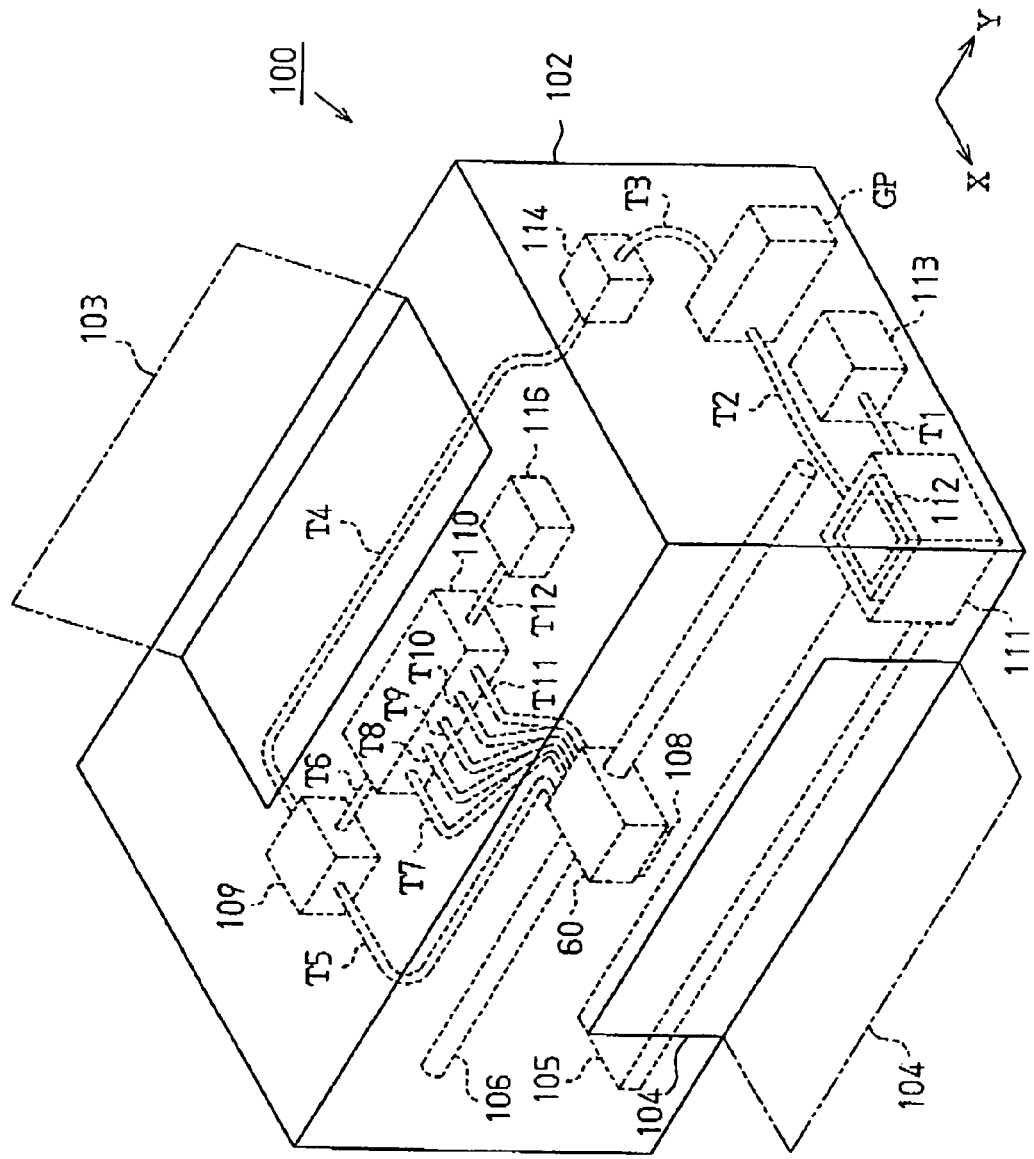
FIG. 12 is a perspective view schematically showing the structure of a printer according to the present invention.

As shown in FIG. 12, a printer 100, or a liquid ejecting apparatus, includes a substantially parallelepiped frame 102. A paper feeding tray 103 is provided at an upper surface of the frame 102. A paper discharge tray 104 is arranged at a front surface of the frame 102. Each of the paper feeding tray 103 and the paper discharge tray 104 is secured to the frame 102 by a non-illustrated hinge mechanism such that the trays 103, 104 are received in the frame 102 in a folded state.

A platen 105 is formed in the frame 102, extending along the longitudinal direction (direction Y) of the frame 102. A recording paper is inserted into the frame 102 through the paper feeding tray 103 and supplied to the platen 105 along direction X (perpendicular to axis Y) by a non-illustrated paper sending mechanism. The recording paper is then discharged from the frame 102 through the paper discharge tray 104.

A guide member 106 is formed in the frame 102 and extends parallel with the platen 105. A carriage 60 is movably supported by the guide member 106. The valve device 1 is installed in the carriage 60. A carriage motor (not shown) is secured to the frame 102. The carriage 60 is operably connected to the carriage motor through a timing belt (not shown) wound around a pair of pulleys (not shown). Therefore, when the carriage motor is driven, the drive force of the carriage motor is transmitted to the carriage 60 through the timing belt. The carriage 60 is thus moved reciprocally in a direction parallel with the platen 105 (main scanning direction Y), as guided by the guide member 106.

Figure 16:
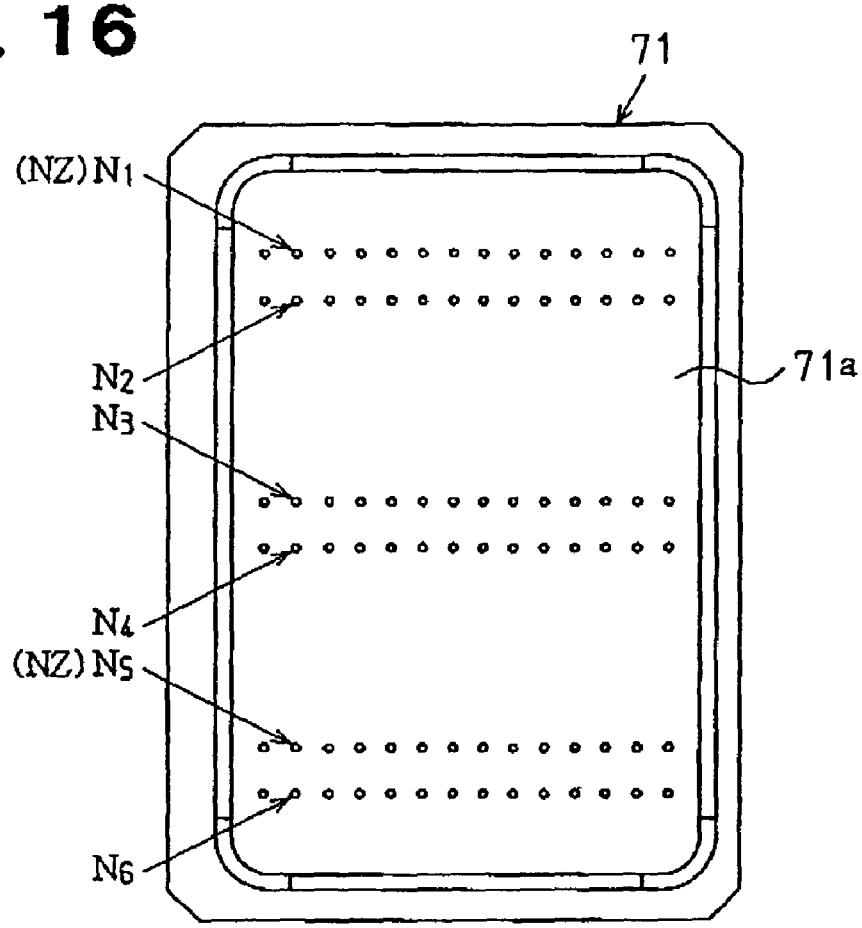
FIG. 16 is a plan view showing a nozzle forming surface of a recording head of FIG. 14.
Figure 17:
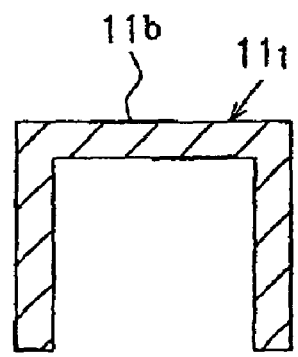
FIG. 17 is a cross-sectional view taken along line A-A of FIG. 15.

A recording head 108 serving as a liquid ejection head is formed in a lower surface of the carriage 60 (a surface opposed to the platen 105). The recording head 108 includes a nozzle forming surface 108a (see FIG. 13) facing the recording paper. In the-nozzle forming surface 108a, six nozzle lines $N_1$ to $N_6$ (see FIG. 16), in each of which nozzles NZ (see FIG. 13) are provided in a number n (n=natural number), are aligned. In this example, the number of the nozzle lines $N_1$ to $N_6$ is set to six and the number of the nozzles NZ provided in each of the nozzle lines is set to n, for the purposes of explanation. However, the number of the nozzles NZ per nozzle line and the number of the nozzle lines $N_1$ to $N_6$ are not restricted to the example but may be modified as needed.

A first ink cartridge 109 and a second ink cartridge 110, each serving as a liquid retaining portion, are provided in the frame 102. As will be discussed later, each of the first and second ink cartridges 109, 110 supplies the color ink, which is liquid, corresponding to each of the nozzles NZ (black, cyan, magenta, yellow, light cyan, or light magenta), to the recording head 108. The ink supplied to the recording head 108 is pressurized by the piezoelectric element 108b (see FIG. 13) and ejected from the corresponding nozzle NZ of the recording head 108 as an ink drop, thus forming a dot. In other words, each of the nozzles NZ formed in the recording head 108 ejects ink of a corresponding color, which is black, cyan, magenta, yellow, light cyan, or light magenta.

The printer 100 includes a printing region for performing printing by reciprocally moving the carriage 60 and ejecting ink drops to the recording paper. The printer 100 further has a non-printing region for sealing the nozzles NZ when printing is not performed. As shown in FIG. 12, a cap holder 111 is formed in the non-printing region.

The cap holder 111 is provided with a flexible cap member 112 such that the cap member 112 opposes the nozzle forming surface 108a of the recording head 108. The cap holder 111 seals the nozzles NZ by placing the cap member 112 in tight contact with the nozzle forming surface 108a of the recording head 108 by means of a non-illustrated drive mechanism. Referring to FIG. 13, communication holes 112a, 112b are defined in the bottom of the cap member 112 and connected with the interior of the cap member 112. A cap opening valve 113 is connected to the communication hole 112a through a tube T1 in the exterior of the cap holder 111. The cap opening valve 113 opens the space defined by the tight contact between the cap member 112 and the nozzle forming surface 108a, when necessary. A suction port (not shown) of a gear pump GP is connected to the communication hole 112b through a tube T2. The gear pump GP includes gears G1, G2. When the drive force of a non-illustrated drive motor is transmitted to the gear pump GP, the gears G1, G2 are rotated such that negative pressure is supplied to the cap member 112. That is, by driving the gear pump GP with the cap member 112 sealing the nozzle forming surface 108a, negative pressure may be supplied to the nozzles NZ of the nozzle forming surface 108a for cleaning the nozzle forming surface 108a.

An adjustment device 114 is connected to a discharge port (not shown) of the gear pump GP through a tube T3. The first ink cartridge 109 is connected to the adjustment device 114 through a tube T4.

The first ink cartridge 109 includes an ink pack B for retaining black ink and an ink absorbing body 115 for absorbing ink. The ink pack B is connected to the recording head 108 of the carriage 60 through a tube T5. The ink absorbing body 115 is formed by, for example, a water-absorbing porous material such as sponge.

Accordingly, the waste ink and air drawn from the cap member 112 by the gear pump GP are introduced into the first ink cartridge 109. The waste ink is then absorbed by the absorbing body 115 in the first ink cartridge 109. The amount and flow of the waste ink and air sent to the first ink cartridge 109 are adjusted by the adjustment device 114.

The second ink cartridge 110 is connected to the first ink cartridge 109 through a tube T6. The first and second ink cartridges 109, 110 are connected to each other through the tube T6. The second ink cartridge 110 includes ink packs C, M, YL, LC, and LM for retaining ink of cyan, magenta, yellow, light cyan, and light magenta, respectively. The ink packs C, M, YL, LC, and LM are connected to the recording head 108 of the carriage 60 through tubes T7, T8, T9, T10, and T11, respectively. An opening device 116 is connected to the second ink cartridge 110 through a tube T12 for opening the second ink cartridge 110 when necessary.

Thus, when the gear pump GP is driven, the waste ink and air are drawn from the cap member 112 and flows from the cap member 112 through the tube T2, the gear pump GP, the tube T3, the adjustment device 114, and the tube T4, to the ink cartridge 109. Since the waste ink is absorbed by the ink absorbing body 115 in the first ink cartridge 109, only the air (hereinafter, referred to as "pressurized air") flows in the first ink cartridge 109. The pressurized air flows from the first ink cartridge 109 to the second ink cartridge 110 through the tube T6 and is then retained in the opening device 116 connected to the tube T12.

In other words, the air pressure in the first ink cartridge 109 and that in the second ink cartridge 110 are constantly equal to each other, without a difference. Thus, if the gear pump GP is driven, the air pressure in each of the first and second ink cartridges 109, 110 is increased due to the pressurized air. The ink packs B, C, M, YL, LC, and LM are thus pressurized. The ink retained in each of the ink packs B, C, M, YL, LC, and LM is thus sent to the recording head 108 of the carriage 60 in a pressed manner.

That is, in the printer 100 of this embodiment, the gear pump GP includes a cleaning pump for supplying negative pressure to the cap member 112 and a pressurization pump for pressurizing the ink packs B, C, M, YL, LC, and LM. The gear pump GP in a drive state thus supplies negative pressure to the cap member 112 for drawing the waste ink and air from the cap member 112 and pressurizes the ink packs B, C, M, YL, LC, and LM for sending the ink to the recording head 108.

The inkjet printer has the following advantage.

It is possible to minimize and reduce the thickness of the inkjet type printer.

The present invention is not to be limited to the illustrated embodiments, but may include modified or improved forms achieved within the scope of the objective of the invention. Thus, for example, the present invention may be embodied in the following modified forms.

In the first embodiment of FIG. 1, the material having relatively low permeability for water, oxygen, or nitrogen is indicated as an example of the material of the film member 6 serving as the pressure receiving member. However, the material of the film member 6 is not restricted to the indicated material but may be a mono-layer film or a rubber film. If these films are employed, an additional component may be provided in the film member 6 for meeting the requirement of the low permeability for water, oxygen, or nitrogen.

In the first embodiment of FIG. 1, the communication hole 17, which connects the liquid supply chamber 16 to the pressure chamber 4, is formed in a circular shape. The valve shaft 12 of the valve body 9 is passed through the communication hole 17 such that a gap is defined between the valve shaft 12 and the circumferential surface of the communication hole 17. However, the present invention is not restricted to this but may be configured such that the communication hole 17 has any suitable shape other than the circular shape.

Figure 3:
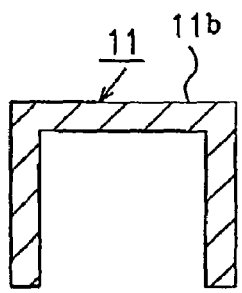
FIG. 3 is a cross-sectional view taken along line B-B of FIG. 2.

In the first embodiment of FIG. 3, the actuation lever 11 is bent to have a channel-like cross-sectional shape. However, other than this, the supported end 11a and the pressing portion 11b of the actuation lever 11 may be formed of different materials having different levels of rigidity. The supported end 11a is secured to the pressing portion 11b by an adhesive or through deposition. In this manner, the rigidity difference between the supported end 11a and the pressing portion 11b is ensured.

Figure 4:
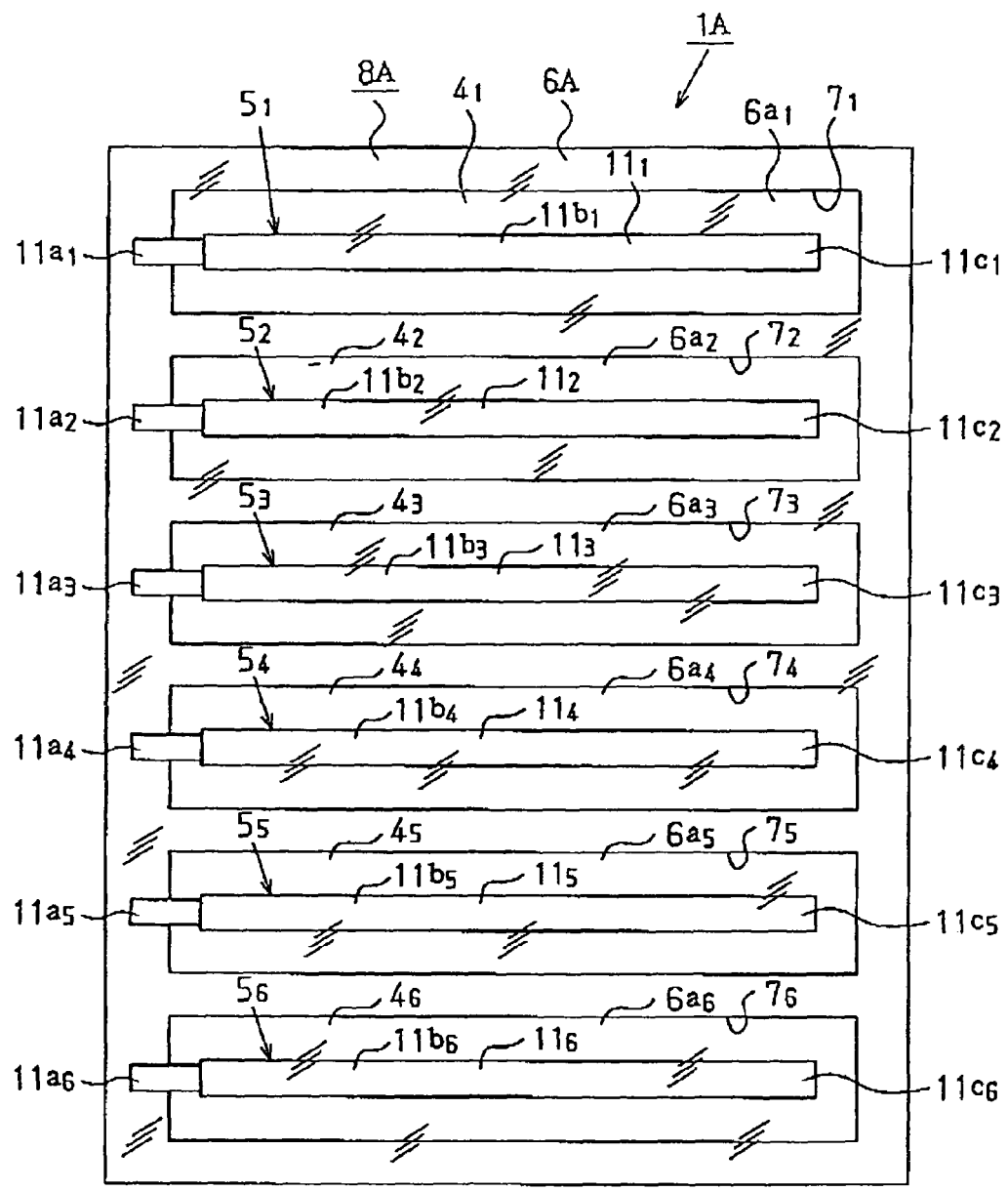
FIG. 4 is a plan view showing a valve device according to a second embodiment of the present invention.

In the second embodiment of FIG. 4, the valve device 1A using six colors of ink has been discussed as an example. However, the present invention may be applied to a valve device using a different number of color inks, other than six. For example, if the valve device uses four colors of ink, four groove-like passages $7_1$ to $7_4$ are arranged in parallel and four pressure regulators $5_1$ to $5_4$ are provided.

In the third embodiment of FIG. 5, the valve body 9B, which is a substantially L-shaped lever, is urged by the plate spring 10B serving as the pressure adjustment spring arranged in the pressure chamber 4. The valve body 9B thus presses the seal member 13 against the seal surface 4a of the pressure chamber 4. However, instead of the plate spring 10B, the valve body 9B may be urged by a torsion coil spring in a similar manner.

The valve devices of the illustrated embodiments may be applied to a different liquid ejecting apparatus other than the inkjet type printer, which is, for example, an inkjet type recording device ejecting ink (including printing devices such as a fax and a copier), or a liquid ejecting apparatus ejecting a different type of liquid other than the ink. For example, the present invention may be applied to a liquid ejecting apparatus ejecting electrode material or color material used in the manufacture of liquid crystal displays, EL displays, and surface emitting displays, or a liquid ejecting apparatus ejecting biological organic matter used in the manufacture of biochips, or a sample ejecting apparatus serving as a precision pipet.

Figure 13:
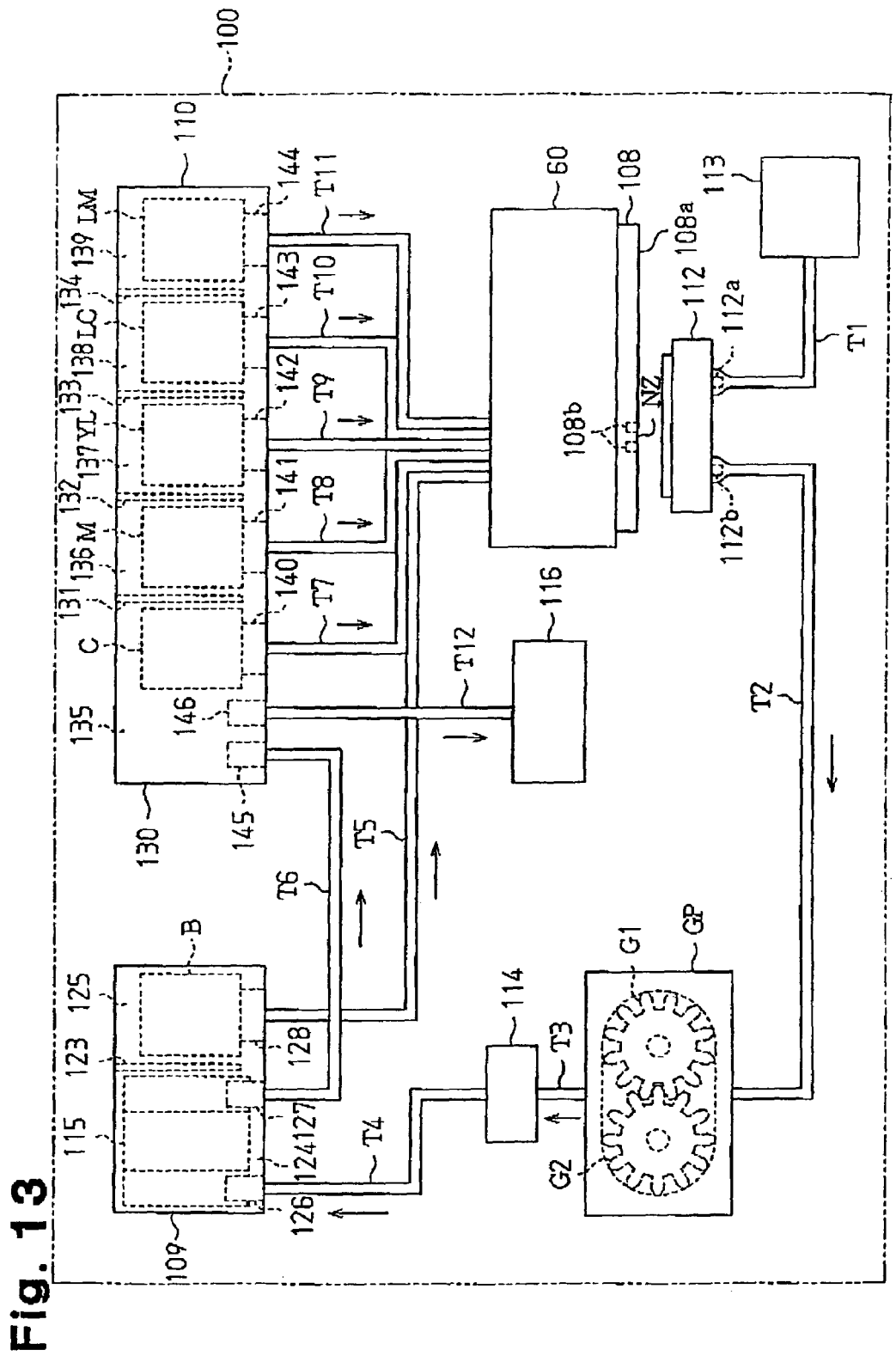
FIG. 13 is a block diagram schematically showing the structure of the printer of FIG. 12.

In accordance with FIGS. 12 and 13, the inkjet type printer in which the valve device 1 of the first embodiment is installed in the carriage 60 (an on-carriage type printer) has been discussed. However, the present invention may be applied to an inkjet type printer in which the valve device 1 is arranged not in the carriage 60 but in a liquid supply line supplying liquid from the liquid retaining portions (the cartridges 109, 110) to the liquid ejection head (the recording head 108).

The present invention is also applied to an inkjet type printer in which any of the valve devices 1A to 1D of the second to fifth embodiments is installed in the carriage 60, or an inkjet type printer in which such valve device is provided in the liquid supply line supplying liquid from the liquid retaining portions to the liquid ejection head, instead of the carriage 60.

The liquid used in the valve device of each of the illustrated embodiments is not restricted to the ink but may be a different type of liquid other than the ink.

Figure 14:
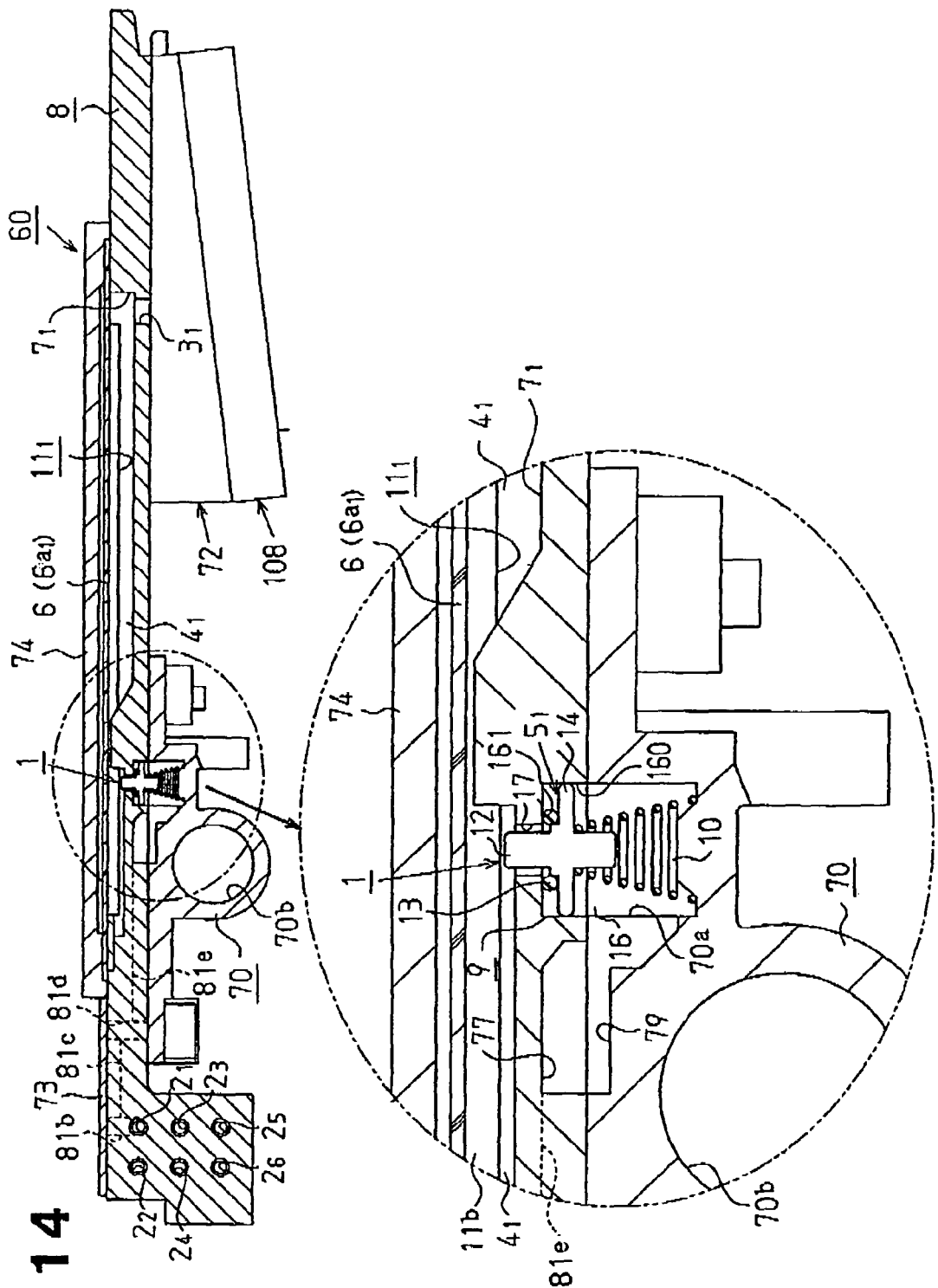
FIG. 14 is a cross-sectional view showing a carriage according to a sixth embodiment of the present invention, together with an enlarged view showing a portion thereof.
Figure 18:
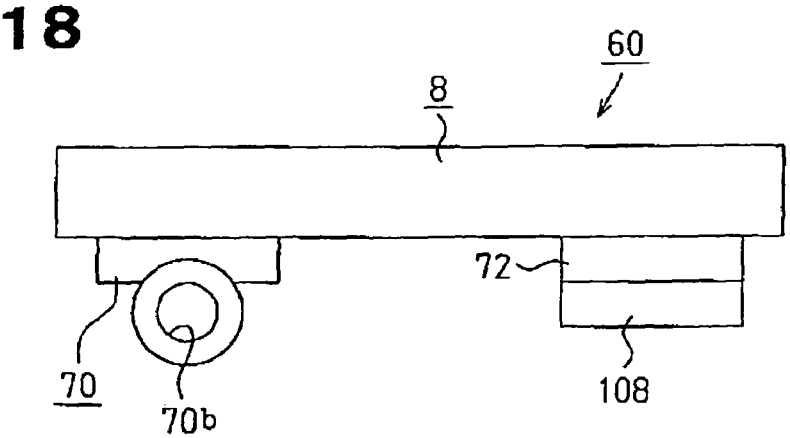
FIG. 18 is a view schematically showing the carriage of FIG. 14.

A carriage 60 according to a sixth embodiment of the present invention will be described with reference to FIGS. 14 to 18. FIG. 14 is a view showing the carriage 60 of the sixth embodiment accompanied by an enlarged view showing a portion of the carriage 60. FIG. 18 is a diagrammatic view schematically showing the structure of the carriage 60 of FIG. 14.

The carriage 60 is used in an inkjet type printer serving as a liquid ejecting apparatus using six color inks as different types of liquid. The six colors correspond to black, cyan, magenta, yellow, light cyan, and light magenta.

As shown in FIG. 14, the carriage 60 has the passage defining member 8 and a spring receiving member 70. The valve device 1 is installed in a portion of the carriage 60. The carriage 60 includes the recording head 108 serving as the liquid ejection head. The recording head 108 is secured to a right end portion of the lower surface of the passage defining member 8 through a passage plate 72. The passage holding plate 73 and the film protecting plate 74 are provided on the upper surface of the passage defining member 8.

Figure 15:
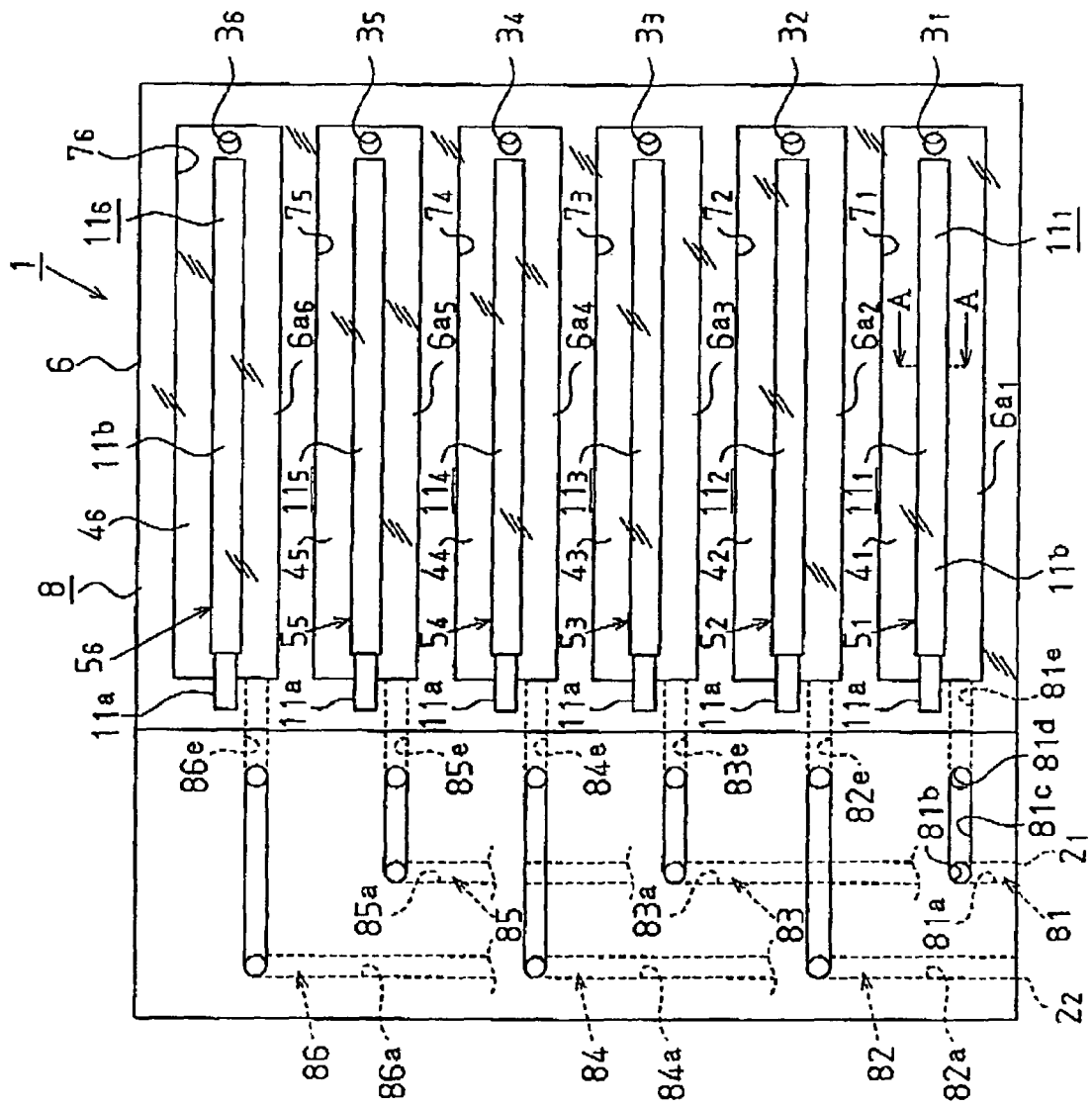
FIG. 15 is a plan view showing the carriage of FIG. 1 without a passage holding plate and a film protecting plate.

The valve device 1 includes, as shown in FIGS. 14 and 15, six pressure chambers $4_1$ to $4_6$, which are connected respectively to six liquid inlets $2_1$ to $2_6$ and six liquid outlets $3_1$ to $3_6$ for retaining six color inks, and six pressure regulators $5_1$ to $5_6$.

Each of the pressure regulators $5_1$ to $5_6$ includes a corresponding one of six rectangular groove-like passages $7_1$ to $7_6$ defined in the passage defining member 8, the valve body 9, the pressure adjustment spring 10, a corresponding one of actuation levers $11_1$ to $11_6$ for pressing the valve body 9 toward the open position against the urging force of the pressure adjustment spring 10, and the film member 6 sealing the groove-like passages $7_1$ to $7_6$ and defining the pressure chambers $4_1$ to $4_6$. For example, the pressure regulators $5_1$ includes the rectangular groove-like passage $7_1$, the valve body 9, the pressure adjustment spring 10, the actuation lever $11_1$, and the film member 6 sealing the groove-like passage $7_1$ and defining the pressure chamber $4_1$. The pressure regulators $5_2$ includes the rectangular groove-like passage $7_2$, the valve body 9, the pressure adjustment spring 10, the actuation lever $11_2$, and the film member 6 sealing the groove-like passage $7_2$ and defining the pressure chamber $4_2$. The pressure regulators $5_3$ to $5_6$ are configured in the same manner as the pressure regulators $5_1$ and $5_2$. In FIG. 14, among the six valve bodies 9, only the valve body 9 for the pressure regulator $5_1$ is shown.

The film member 6 is thermally deposited on the surface of the passage defining member 8 for sealing the openings of the groove-like passages $7_1$ to $7_6$, such that the six pressure chambers $4_1$ to $4_6$ are defined. The film member 6 forms part of the outer walls of the pressure chambers $4_1$ to $4_6$. The rectangular portions of the film member 6 sealing the groove-like passages $7_1$ to $7_6$, or the portions of the film member 6 sealing the openings of the groove-like passages $7_1$ to $7_6$, correspond to the pressure receiving portions $6a_1$ to $6a_6$ (see FIG. 15).

Each of the pressure regulators $5_1$ to $5_6$ is moved to the open position by actuation force greater than the pressing force caused by the elastic deformation of the corresponding pressure receiving portion $6a_1$ to $6a_6$ of the film member 6 in an inward direction of the pressure chamber $4_1$ to $4_6$.

The six color inks are supplied from the ink cartridges 109, 110 each serving as the liquid retaining portion to the liquid inlets $2_1$ to $2_6$ through the tubes T5, T7 to T11, each of which forms part of the liquid supply line. The ink discharged from the liquid outlets $3_1$ to $3_6$ is supplied to the recording head 108 through a passage defined in the passage plate 72.

The nozzle forming surface 108a (see FIG. 16) is formed at the lower end of the recording head 108. In the nozzle forming surface 108a, the six nozzle lines $N_1$ to $N_6$, in each of which nozzles are provided in a number n (n=natural number), are aligned. The color inks that have been sent from the liquid outlets $3_1$ to $3_6$ to the recording head 108 through the passage of the passage plate 72 are discharged from the nozzles NZ of the corresponding one of the nozzle lines $N_1$ to $N3_6$ as ink drops.

As has been described, the six groove-like passages $7_1$ to $7_6$ retaining the six color inks are aligned in parallel and the six pressure regulators $5_1$ to $5_6$ are provided in the carriage 60.

Each of the valve bodies 9 of the pressure regulators $5_1$ to $5_6$ is movable between the open position and the closed position (the position of FIG. 14). When each valve body 9 is located at the open position, the corresponding liquid inlet $2_1$ to $2_6$ is connected to the associated groove-like passage $7_1$ to $7_6$. In correspondence with the closed position, the liquid inlet $2_1$ to $2_6$ is disconnected from the groove-like passage $7_1$ to $7_6$. The valve body 9 is urged by the pressure adjustment spring 10 toward the closed position.

In each of the pressure regulators $5_1$ to $5_6$, when the pressure in the pressure chamber $4_1$ to $4_6$ becomes lower than the predetermined level, the pressure receiving portion $6a_1$ to $6a_6$ of the film member 6 is elastically deformed in an inward direction of the pressure chamber $4_1$ to $4_6$. The actuation lever $11_1$ to $11_6$ urges the valve body 9 toward the open position by the actuation force greater than the pressing force produced by the elastic deformation of the pressure receiving portion $6a_1$ to $6a_6$.

Referring to FIG. 14, six valve body accommodating recesses 160 are defined in the lower surface of the passage defining member 8. Each of the valve body accommodating recesses 160 is connected to a corresponding one of the six rectangular groove-like passages $7_1$ to $7_6$, or a corresponding one of the pressure chambers $4_1$ to $4_6$ of the associated pressure regulators $5_1$ to $5_6$, through a corresponding one of six communication holes 17 defined in the passage defining member 8. Six valve body accommodating recesses 70a are defined in the upper surface of the spring receiving member 70. The upper surface of the spring receiving member 70 is bonded with the lower surface of the passage defining member 8 such that the six valve body accommodating recesses 160 of the passage defining member 8 correspond to the associated, six valve body accommodating recesses 70a of the spring receiving member 70, thus defining six liquid supply chambers 16. Each of the liquid supply chambers 16 receives the valve shaft 12 of the corresponding pressure regulator $5_1$ to $5_6$, the seal portion 13, and the pressure adjustment spring 10.

The pressure adjustment spring 10 of each pressure regulator $5_1$ to $5_6$ is clamped between the jaw 14 of the valve body 9 and an inner portion (the bottom) of the associated valve body accommodating recess 70a. In this manner, the valve body 9 is urged by the pressure adjustment spring 10 toward the closed position at which the seal portion 13 is pressed against a seal surface 161 of the valve body accommodating recess 160, while the valve shaft 12 is passed through the communication hole 17 with a gap defined between the valve shaft 12 and the wall of the communication hole 17.

Further, the liquid inlets $2_1$ to $2_6$ and six passages 81 to 86 are defined in the left end of the passage defining member 8 (opposed to the right end of the passage defining member 8 to which the recording head 108 is secured). Each of the passages 81 to 86 introduces the color ink supplied to the corresponding liquid inlet $2_1$ to $2_6$ separately to the associated one of the six liquid supply chambers 16.

With reference to FIGS. 14 and 15, the passage 81 includes a first section 81a extending horizontally from the liquid inlet $2_1$, a second section 81b extending vertically upward from an end of the first section 81a, a third section 81c extending horizontally from an opening (an upper end) of the second section 81b, a fourth section 81d extending vertically downward from the right end of the third section 81c, and a fifth section 81e extending horizontally from a lower end of the fourth section 81d. The fifth section 81e is connected to the corresponding one of the six valve body accommodating recesses 70a through a recess 77 defined in the passage defining member 8 and a recess 79, which is defined in the spring receiving member 70 and connected to the recess 77. Accordingly, the ink supplied to the liquid inlet $2_1$ flows through the sections 81a to 81e of the passage 81 in this order and is introduced to the corresponding valve body accommodating recess 70a through the recess 77 of the passage defining member 8 and the recess 79 of the spring receiving member 70. The passage 81 and the recesses 77, 79 form the inlet passage.

Like the passage 81, each of the passages 82 to 86 includes a first section 82a to 86a, a second section 82b to 86b, a third section 82c to 86c, a fourth section 82d to 86d, and a fifth section 82e to 86e (see FIG. 15). The fifth section 82e to 86e of each passage 82 to 86 is connected with the corresponding valve body accommodating recess 70a through a recess defined in the passage defining member 8 like the recess 77 and a recess defined in the spring receiving member 70 and connected to the aforementioned recess (like the recess 79).

In FIG. 14, only the first section 81a of the passage 81 is illustrated and the first sections of the passages 82 to 86 are omitted.

The passage plate 72, which is shown in FIG. 14, includes six separate lines (not shown) for guiding the color inks from the corresponding, six liquid outlets $3_1$ to $3_6$ to the associated nozzle lines $N_1$ to $N_6$ of the recording head 108.

The spring receiving member 70, shown in FIG. 14, includes a bearing portion 70b that is engaged with a guide shaft (corresponding to the guide member 106 of FIG. 16) for guiding the carriage 60 such that the carriage 60 moves reciprocally.

An outer circumferential portion of the film member 6 of FIG. 15 is pressed against the passage defining member 8 by the film protecting plate 74, which is formed as a rectangular frame. The film protecting plate 74 is fixed to the upper surface of the carriage 60.

The passage holding plate 73 for sealing the openings of the passages 81 to 86 of FIG. 15 is secured to the portion of the upper surface of the carriage 60 in which the six passages 81 to 86 are defined (see FIG. 14).

As shown in FIG. 18, the carriage 60 according to the six embodiments includes, as main components, the passage defining member 8, the spring receiving member 70 having the bearing portion 70b, and the recording head 108 secured to the passage defining member 8 through the passage plate 72. The passage plate 72 is provided independently from the spring receiving member 70.

In the valve device 1, the ink retained in each of the pressure chambers $4_1$ to $4_6$ is supplied from the corresponding liquid outlet $3_1$ to $3_6$ to the associated nozzle line $N_1$ to $N_6$ of the recording head 108 through the corresponding one of the six passages of the passage plate 72. The ink is then ejected as ink drops to the recording paper from the associated nozzle line $N_1$ to $N_6$, such that the recording paper is subjected to printing.

The sixth embodiment has the following advantages.

The valve device 1 is installed in a portion of the carriage 60. The valve device 1 includes the pressure chambers $4_1$ to $4_6$, each of which is connected to the corresponding one of the six liquid inlets $2_1$ to $2_6$ and the associated one of the six liquid outlets $3_1$ to $3_6$ and retains the corresponding one of the six color inks, and the six pressure regulators $5_1$ to $5_6$. When the pressure in the pressure chamber $4_1$ to $4_6$ becomes lower than the predetermined level, the corresponding pressure regulator $5_1$ to $5_6$ is switched to the open state by the actuation force greater than the pressing force produced by the associated pressure receiving portion $6a_1$ to $6a_6$ of the film member 6, which is elastically deformed in an inward direction of the pressure chamber $4_1$ to $4_6$. When the pressure in the pressure chamber $4_1$ to $4_6$ reaches the predetermined level, the pressure regulator $5_1$ to $5_6$ is returned to the closed state, such that the pressure of the ink in the pressure chamber $4_1$ to $4_6$ is reduced to a predetermined level. That is, each of the actuation levers $11_1$ to $11_6$ produces the actuation force greater than the pressing force of the film member 6. Due to such actuation force, the corresponding pressure regulator is opened against the "seal load". This structure makes it possible to reduce the pressure receiving area of the pressure receiving portion $6a_1$ to $6a_6$ of each pressure regulator $5_1$ to $5_6$. It is thus possible to provide a relatively small and light carriage having a pressure regulator.

The spring receiving member 70 has the function of holding the pressure adjustment spring 10 of each pressure regulator $5_1$ to $5_6$ together with the passage defining member 8, as well as the function of the bearing portion 70b that is engaged with the guide shaft. This structure reduces the number of components. It is thus possible to further minimize and reduce the thickness of the carriage 60 and decrease the cost for the carriage 60.

The passage plate 72, which has the passages from the liquid outlets $3_1$ to $3_6$ to the recording head 108, is provided between the passage defining member 8 and the recording head 108, independently from the spring receiving member 70. This structure provides an alignment mechanism for the recording head 108 located between the passage defining member 8 and the passage plate 72.

Figure 19:
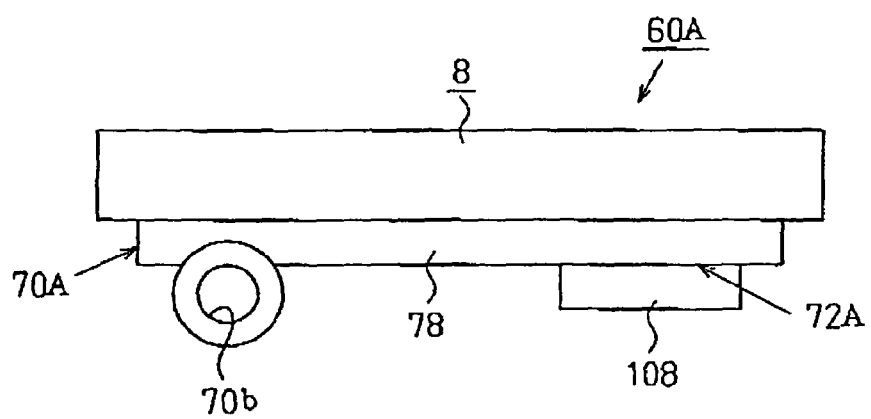
FIG. 19 is a view schematically showing the structure of a carriage according to a seventh embodiment of the present invention.

A carriage 60A according to a seventh embodiment of the present invention will now be described with reference to FIG. 19. The carriage 60A is characterized in that the passage plate 72 of the sixth embodiment including the passages to the recording head 108 is formed integrally with the spring receiving member 70. In other words, a passage plate section 72A configured in the same manner as the passage plate 72 and a spring receiving section 70A configured in the same manner as the spring receiving member 70 are formed as one body. The resulting component 78 is secured to the passage defining member 8, such that the carriage 60A is formed. The remainder of the configuration of the carriage 60A is the same as the corresponding structure of the carriage 60 of the sixth embodiment.

The seventh embodiment has the following advantage, in addition to the advantages of the sixth embodiment.

For assembling the carriage 60A, the single component 78, which includes the passage plate section 72A and the spring receiving section 70A formed as one body, is simply attached to the passage defining member 8. The recording head 108 is then secured to the component 78. This reduces the number of steps required in assembly of the carriage 60A. The alignment mechanism for the recording head 108 is not provided in the carriage 60A. Thus, the positioning accuracy of the recording head 108 with respect to the passage defining member 8 depends simply on the assembly accuracy of the recording head 108 with respect to the passage defining member 8 by means of the component 78.

Figure 20:
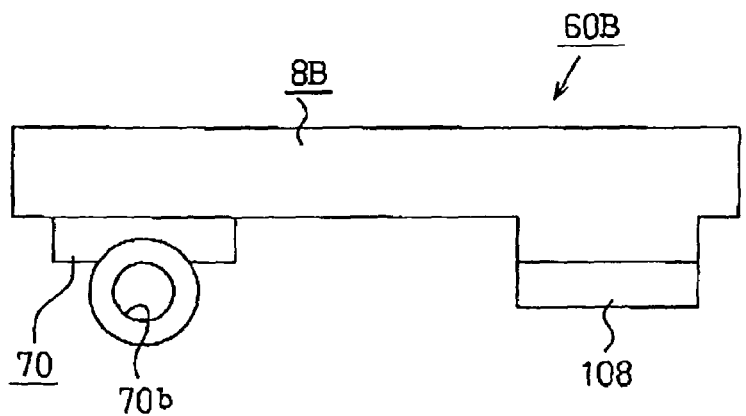
FIG. 20 is a view schematically showing the structure of a carriage according to an eighth embodiment of the present invention.

A carriage 60B according to an eighth embodiment of the present invention will hereafter be explained referring to FIG. 20. The carriage 60B is characterized in that the liquid outlets $3_1$ to $3_6$ defined in a passage defining member 8B configured in the same manner as the passage defining member 8 of the sixth embodiment are connected directly to the recording head 108. The remainder of the configuration of the carriage 60B is the same as the corresponding structure of the carriage 60 of the sixth embodiment.

The eighth embodiment has the following advantage, in addition to the advantages of the sixth embodiment.

Since it is unnecessary to provide the passage plate 72 (see FIG. 18) between the passage defining member 8B and the recording head 108, the number of components and that of the assembly steps of the carriage are decreased accordingly. It is thus possible to reduce the cost for the carriage 60B.

Figure 21:
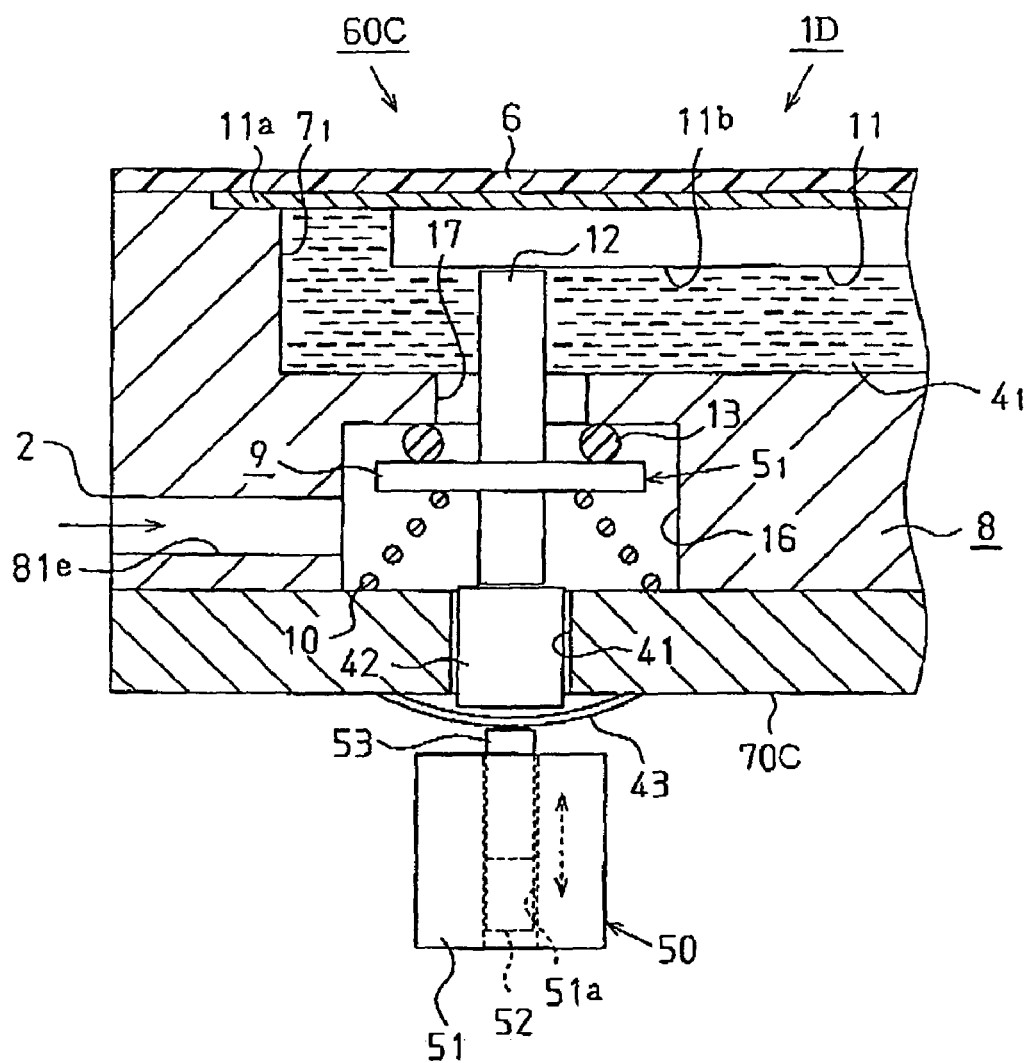
FIG. 21 is a cross-sectional view showing a main portion of a carriage according to a ninth embodiment of the present invention.

A carriage 60C according to a ninth embodiment of the present invention will hereafter be explained referring to FIG. 21. The carriage 60C is characterized in that the valve device 1D of the sixth embodiment, in which the pressure regulators $5_1$ to $5_6$ each functions as a choke valve, is installed in the carriage 60C. In FIG. 21, only the pressure regulator $5_1$ of the six pressure regulators $5_1$ to $5_6$ of the sixth embodiment is shown.

In the valve device 1D, in place of the spring receiving member 70 of the sixth embodiment, a spring receiving member 70c, which is formed by defining a communication hole 41 in the spring receiving member 70, is secured to the lower surface of the passage defining member 8. The communication hole 41 is located below the valve shaft 12 of the valve body 9. The movable pin 42 is received in the communication hole 41.

The pin actuator 50 is provided below each of the pressure regulators $5_1$ to $5_6$ of the valve device 1D.

The invention may be embodied in the following modified forms.

In the sixth to ninth embodiments, the valve body 9 of each of the pressure regulators $5_1$ to $5_6$ may be modified to the L-shaped valve body shown in FIGS. 5 to 10.

Figure 22:
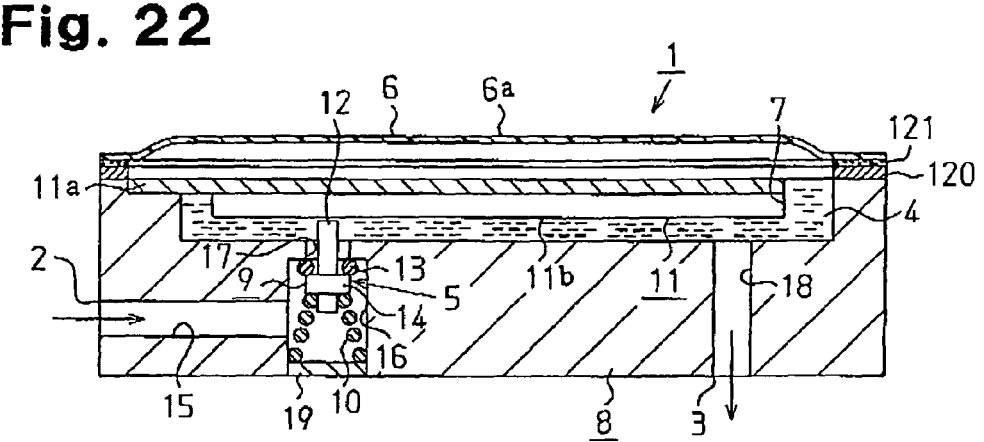
FIG. 22 is a cross-sectional view showing a valve device according to a tenth embodiment of the present invention, as taken along line A-A of FIG. 23.
Figure 23:
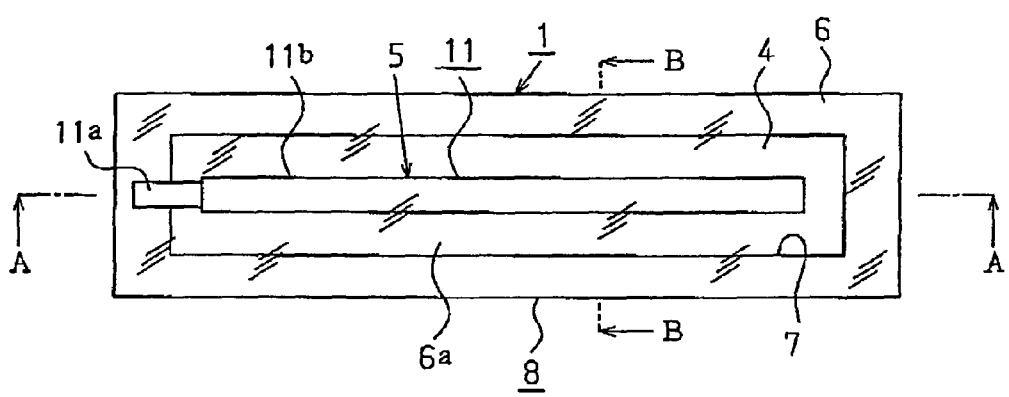
FIG. 23 is a plan view showing the valve device of FIG. 22.
Figure 24:
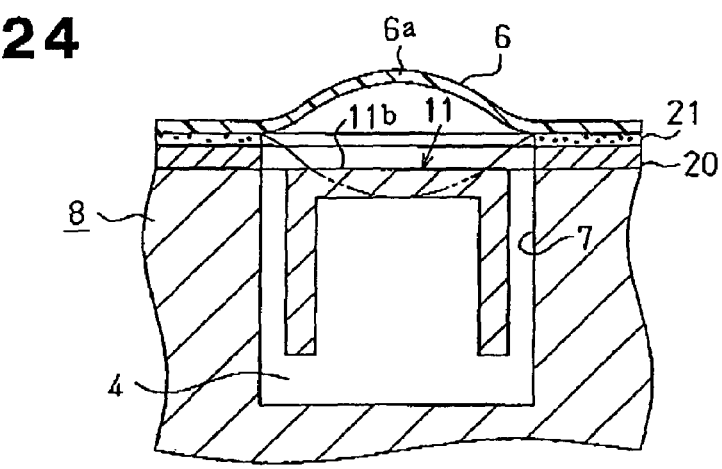
FIG. 24 is-a cross-sectional view taken along line B-B of FIG. 23.

The valve device 1 according to a tenth embodiment of the present invention will now be described referring to FIGS. 22 to 24. As shown in FIG. 22, the valve device 1 includes the pressure regulator 5 decreasing the liquid pressure of the pressure chamber 4 to a predetermined level. The pressure chamber 4 is connected to the liquid inlet 2 and the liquid outlet 3 and retains liquid such as ink.

The film member 6 is formed of a material that does not scientifically affect the ink properties and indicates a relatively low permeability for water, oxygen, and nitrogen, such as a PPS (polyphenylene sulfide) film.

The film member 6 is sufficiently thin for being elastically deformable due to pressure change in the pressure chamber 4. For example, a film having a thickness of 10 μm or smaller is employed as the film member 6. By the wordings "the film member 6 being elastically deformable due to pressure change in the pressure chamber 4", it is indicated that, when the pressure in the pressure chamber 4 is decreased to a level lower than the predetermined level, the film member 6 is elastically deformed from the shape shown by the solid lines in FIG. 24 to the shape shown by the double-dotted chain lines in the drawing, and that, when the pressure in the pressure chamber 4 is increased to the predetermined level, the film member 6 is elastically deformed from the shape shown by the double-dotted chain lines in FIG. 24 to the shape shown by the solid lines in the drawing.

The valve body 9 is movable between the open position for connecting the liquid inlet 2 to the groove-like passage 7 and the closed position (the position of FIG. 22) for disconnecting the liquid inlet 2 from the groove-like passage 7.

A metal thin plate 120 formed of SUS or the like in a rectangular frame-like shape is bonded with the circumference of the film member 6 through an adhesive 121. As shown in FIG. 24, the film member 6 is secured to the surface of the passage defining member 8 through the metal thin plate 120, as bent in an outwardly projecting dome-like manner.

The tenth embodiment has the following advantages.

The pressure regulator 5 is opened by the actuation force greater than the pressing force by which the film member 6 presses the actuation lever 11. This structure reduces the pressure receiving area of the film member 6, making it possible to minimize and decrease the thickness of the valve device 1.

The film member 6 is sufficiently thin for being elastically deformable due to pressure change in the pressure chamber 4. Therefore, relatively small reactive force acts on the film member 6 when the film member 6 presses the actuation lever 11. It is thus possible to install the film member 6 having the small pressure receiving area in a bent state like a dome.

A manufacture method of the valve device 1 of the tenth embodiment, or, more particularly, an installation method of the film member 6 with respect to the passage defining member 8 by bending the film member 6 in a projecting dome-like shape, will be explained with reference to FIGS. 25(a) to 25(e).

The manufacture method includes the flowing steps (1) to (4).

Figure 25A:
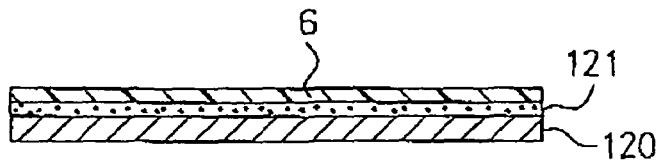
FIGS. 25(a) to 25(e) are views explaining a manufacture method of the valve device of FIG. 22.

(1) The step of bonding the film member 6 with the metal thin plate 120 of, for example, SUS, by means of the adhesive 121 (see FIG. 25(a));

In the bonding step, a film having a thickness of four μm or smaller, for example, is used as the film member 6. The thickness of the layer formed by the adhesive 121 is three μm and the thickness of the SUS metal thin plate 120 is 30 μm.

Figure 25B:
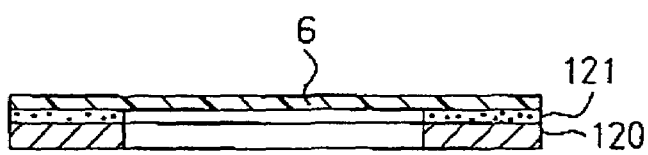

(2) The step of removing a portion of the metal thin plate 120, with which the film member 6 is bonded, corresponding to the opening of the groove-like passage 7 through processes such as etching (see FIG. 25(b)).

Figure 25C:
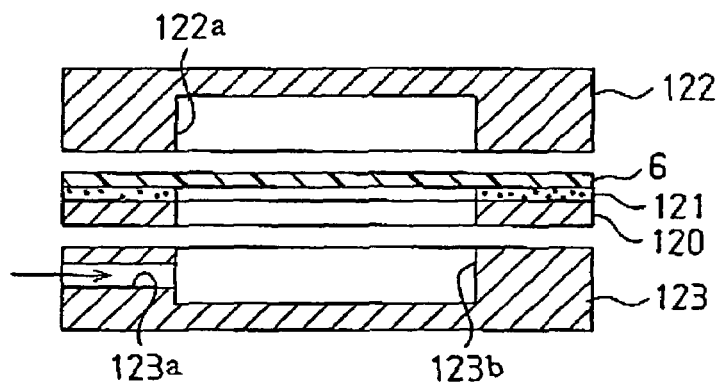

(3) The step of bending the film member 6 in a dome-like shape through pressure molding (see FIG. 25(c));

More specifically, in step (3), the film member 6 and the metal thin plate 120 are placed between a receiving mold 122 and a pressing container 123. The mold 122 and the container 123 are then placed in tight contact. In this state, pressurizing fluid (pressurizing gas or pressurizing liquid) is supplied to a recess 123b of the container 123 through a fluid inlet 123a of the container 123. The pressurizing fluid thus presses the film member 6 such that the film member 6 is deformed in accordance with a recess 122a of the-receiving mold 122. As a result, the film member 6 is deformed from the flat state shown in FIG. 25(c) to the dome-like bent state shown in FIG. 25(d).

When the film member 6 is subjected to pressure molding in step (3), the film member 6 is heated. That is, the film member 6 is exposed to a temperature equal to or higher than the glass transition point of the film member 6.

For example, if a PPS film having a thickness of four μm is employed as the film member 6, it is desired that the pressure molding of the film member 6 is conducted in the atmosphere of 130 degrees Celsius and at the pressure of 2.5 atm.

Figure 25D:
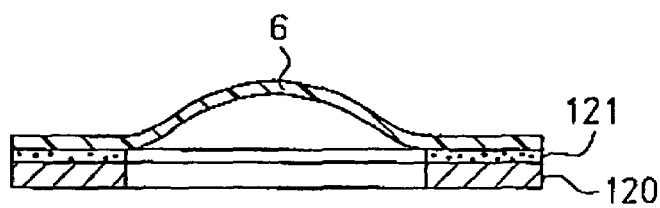
Figure 25E:
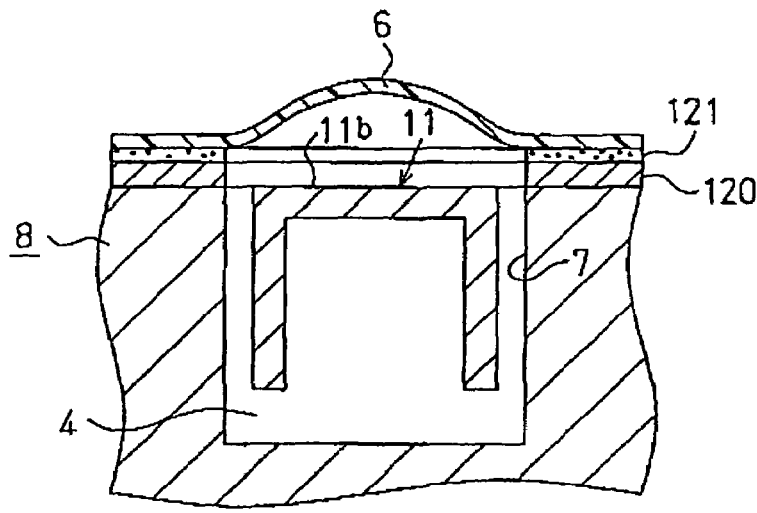

(4) The step of securing the metal thin plate 120, which is bonded with the film member 6 bent in the dome-like shape (see FIG. 25(d)), to the surface of the passage defining member 8 (see FIG. 25(e)).

In accordance with the steps (1) through (4), the film member 6 bent in the dome-like shape is secured to the passage defining member 8, as illustrated in FIG. 25(e).

The manufacture method of the valve device 1 has the following advantages.

The film member 6 is bonded with the metal thin plate 120 from which the portion corresponding to the opening of the groove-like passage 7 has been removed. The metal thin plate 120 is then fixed to the surface of the passage defining member 8 by the adhesive 121. Thus, as compared to a method in which the film member 6 in a bent state is secured to the passage defining member 8 separately, handling, securing, and positioning of the film member 6, which is relatively thin, is facilitated.

By heating the film member 6 in the pressure molding step (3), the film member 6 is deformed relatively easily. Thus, the dome-like bent shape of the film member 6 is stabilized.

For example, by exposing the film member 6 to the temperature equal to or higher than the glass transition point of the film member 6, the film member 6 in the dome-like deformed shape is stabilized. Accordingly, it is possible to minimize the amount of over-time film deformation due to the force reactive to the deformation (the deformation amount of the film member 6 from the dome-like bent shape).

Figure 26:
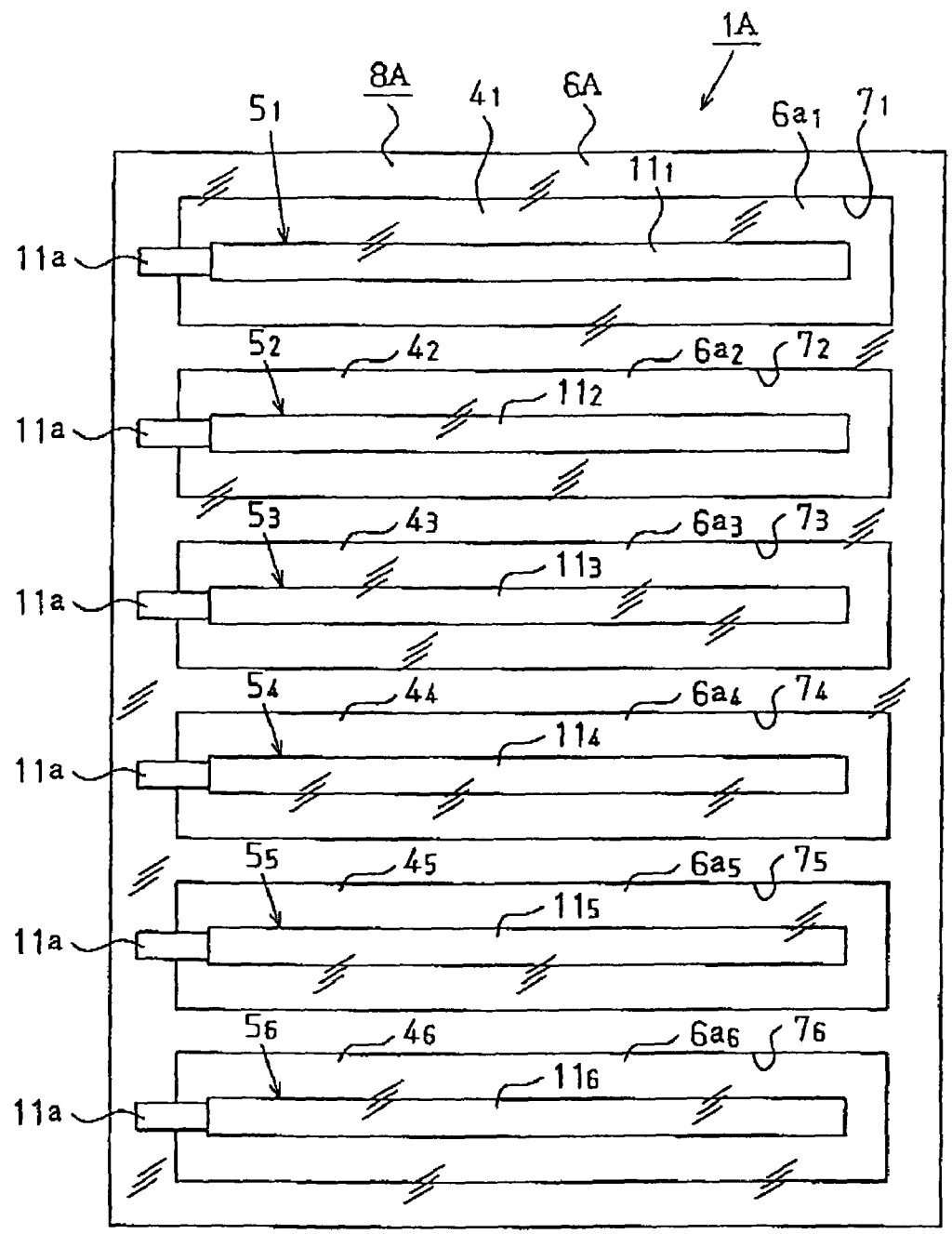
FIG. 26 is a plan view showing a valve device according to an eleventh embodiment of the present invention.

The valve device 1A according to an eleventh embodiment of the present invention will hereafter be explained referring to FIG. 26.

In the valve device 1A, for using six color inks, for example, the six groove-like passages $7_1$ to $7_6$, each of which retains a corresponding one of the color inks, are arranged in parallel and the six pressure regulators $5_1$ to $5_6$ are provided. The film member 6A is adhered to the surface of the passage defining member 8A for sealing the openings of the groove-like passages $7_1$ to $7_6$. This defines the six pressure chambers $4_1$ to $4_6$.

The invention may be modified in the following modified forms.

In the manufacture method of the valve device shown in FIGS. 25(a) to 25(e), a PPS film having a thickness of 10 μm or smaller, for example, the PPS film of 4 μm is employed as the film member 6. However, as long as the film member 6 is sufficiently thin for being elastically deformable due to pressure change in the pressure chamber 4, the film member 6 is not restricted to the configuration of the illustrated embodiment. That is, the thickness of the film member 6 is not restricted to 10 μm or 4 μm.

In the above-described manufacture method, the PPS film having the thickness of 4 μm is used as the film member 6 and the film member 6 is subjected to pressure molding in the atmosphere of 130 degrees Celsius and at the pressure of 2.5 atm, for example. However, the temperature is not restricted to 130 degrees Celsius but may be changed to a different value. Also, although the pressure of 2.5 atm is applied in the atmosphere of 130 degrees Celsius in the embodiment, the pressure is not restricted to this level.

In the manufacture method of the valve device 1 shown in FIGS. 25(a) to 25(e), the step (3) of bending the film member 6 in a dome-like shape through pressure molding is performed prior to the step (4) of securing the metal thin plate 120 from which the portion corresponding to the opening of the groove-like passage 7 has been removed to the surface of the passage defining member 8. However, the pressure molding step (3) of the film member 6 may be conducted after the securing step (4) of the metal thin plate 120 to the surface of the passage defining member 8.

Figure 28:
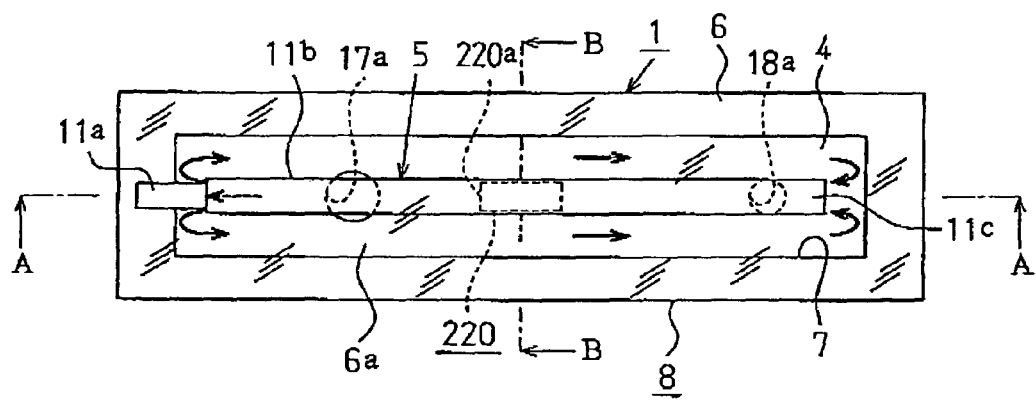
FIG. 28 is a plan view showing the valve device of FIG. 27.
Figure 29:
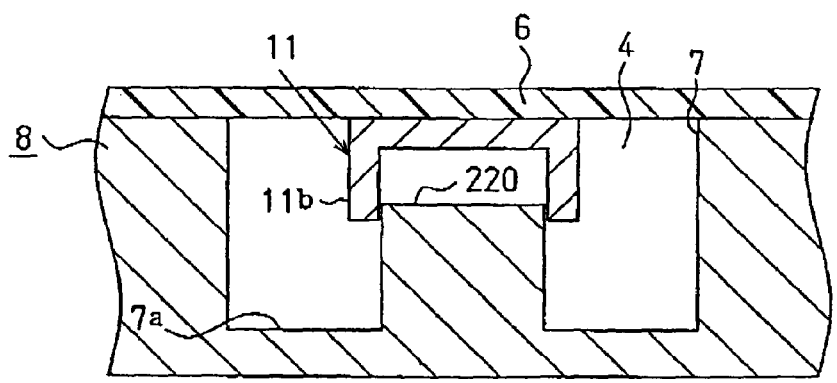
FIG. 29 is a cross-sectional view taken along line B-B of FIG. 28.

The valve device 1 according to a twelfth embodiment of the present invention will now be described with reference to FIGS. 27 to 29.

Figure 27:
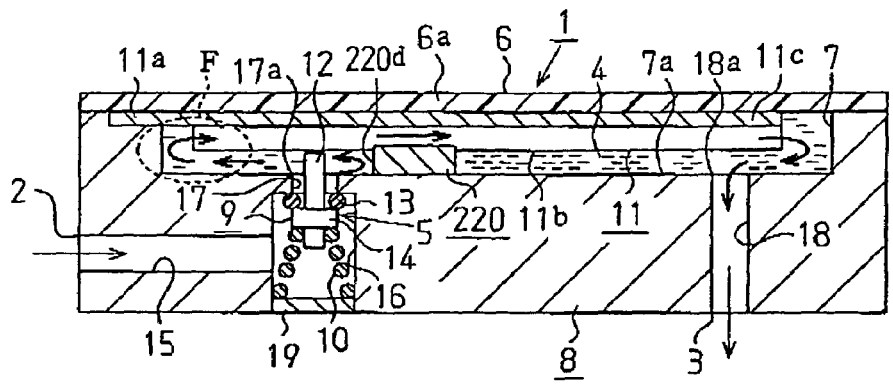
FIG. 27 is a cross-sectional view showing a valve device according to a twelfth embodiment of the present invention, as taken along line A-A of FIG. 28.

As shown in FIG. 27, in the valve device 1, an inlet opening 17a (see FIG. 28) and an outlet opening 18a are defined in a bottom surface 7a of the groove-like passage 7. The inlet opening 17a is selectively opened or closed by the valve body 9. When the valve body 9 is located at the open position, liquid is sent from the liquid inlet 2 to the pressure chamber 4 through the inlet opening 17a. The liquid in the pressure chamber 4 is introduced to the liquid outlet 3 through the outlet opening 18a. The inlet opening 17a corresponds to the opening of the communication hole 17 located at the bottom surface 7a. The outlet opening 18a corresponds to the opening of the outlet passage 18 located at the bottom surface 7a.

Further, the valve device 1 includes a shutter body 220. The shutter body 220 is located between the inlet opening 17a and the outlet opening 18a and on the bottom surface 7a of the groove-like passage 7. As illustrated in FIG. 29, the shutter body 220 may be received by the channel-like pressing portion 11b of the actuation lever 11. The ink as a liquid flows from the inlet opening 17a to the pressure chamber 4 and passes through the space defined by the pressing portion 11b of the actuation lever 11. The ink flow in the space defined by the pressing portion 11b is stopped by an end surface 220a of the shutter body 220 and then reversed toward the supported end 11a of the actuation lever 11. The shutter body 220 corresponds to a bubble discharge portion. The shutter body 220 guides some or all of the ink supplied from the liquid inlet 2 to the pressure chamber 4 to the supported end 11a of the actuation lever 11 in the pressure chamber 4.

For example, if the actuation lever 11 is elastically deformed in a downward direction, the ink stopped by the shutter body 220 passes through the space defined by the channel-like pressing portion 11b and flows to the supported end 11a. After reaching the vicinity of the supported end 11a, the ink proceeds along outer sides (left and right outer sides) of the actuation lever 11 and thus flows to the outlet opening 18a.

The twelfth embodiment has the following advantages.

In the pressure chamber 4, bubbles may be retained in the vicinity of the supported end 11a (portion F of FIG. 27) of the actuation lever 11. In other words, bubbles are retained in the vicinity of the supported end 11a that is opposed to the outlet passage 18 with respect to the communication hole 17. The retained bubbles is pressed by the ink stopped by the shutter body 220 and introduced to the vicinity of the supported end 11a, such that the bubbles are discharged from the outlet opening 18a to the liquid outlet 3 through the outlet passage 18. This structure improves the bubble discharge performance of the valve device 1.

A bubble discharge passage is defined by taking advantage of the shape of the pressing portion 11b of the actuation lever 11, which is bent in a channel-like shape.

Figure 30:
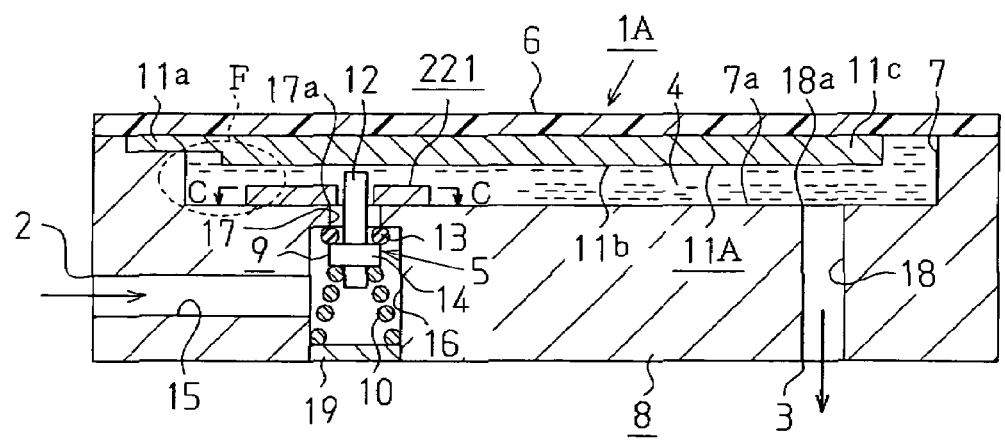
FIG. 30 is a cross-sectional view showing a valve device according to a thirteenth embodiment the present invention.
Figure 31:
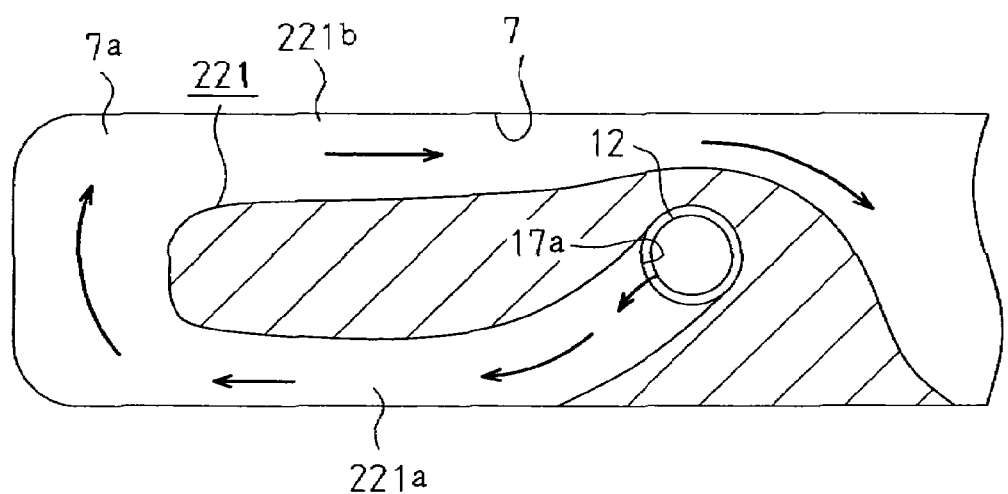
FIG. 31 is a cross-sectional view taken along line C-C of FIG. 30.

The valve device 1A according to a thirteenth embodiment of the present invention will be explained referring to FIGS. 30 and 31. The valve device 1A is different from that of the twelfth embodiment in the following point.

The pressing portion 11b of an actuation lever 11A, which presses the valve body 9, is shaped not in the channel-like manner but in such a manner that the pressing portion 11b has a flat pressing surface as a lower surface. The pressing portion 11b is formed to have a thickness larger than that of the supported end 11a and thus has relatively high rigidity. In the valve device 1A, as shown in FIGS. 30 and 31, a passage defining body 221 is arranged between the inlet opening 17a and the outlet opening 18a and on the bottom surface 7a of the groove-like passage 7. The passage defining body 221 forms the bubble discharge portion and defines a first passage 221a and a second passage 221b. The first passage 221a guides the ink introduced from the inlet opening 17a to the pressure chamber 4 to the supported end 11a of the actuation lever 11a. The second passage 221b guides the ink guided to the supported end 11a of the actuation lever 11A by the first passage 221a to the outlet opening 18a. The first passage 221a and the second passage 221b are located between the passage defining body 221 and the side walls of the groove-like passage 7. Each of the first and second passages 221a, 221b forms a passage shaped substantially like "9".

The thirteenth embodiment has the following advantage, in addition to the advantages of the twelfth embodiment.

After flowing from the inlet opening 17a to the pressure chamber 4, the ink flows to the supported end 11a of the actuation lever 11A in the pressure chamber 4, as guided by the first passage 221a of the passage defining body 221. The ink is then guided to the outlet opening 18a by the second passage 221b. Thus, the bubbles retained in the vicinity of the supported end 11a (portion F of FIG. 30) is pressed by the ink at the supported end 11a of the actuation lever 11A, such that the bubbles are discharged from the outlet opening 18a to the liquid outlet 3 through the outlet passage 18. This structure improves the bubble discharge performance of the valve device 1A.

Figure 32:
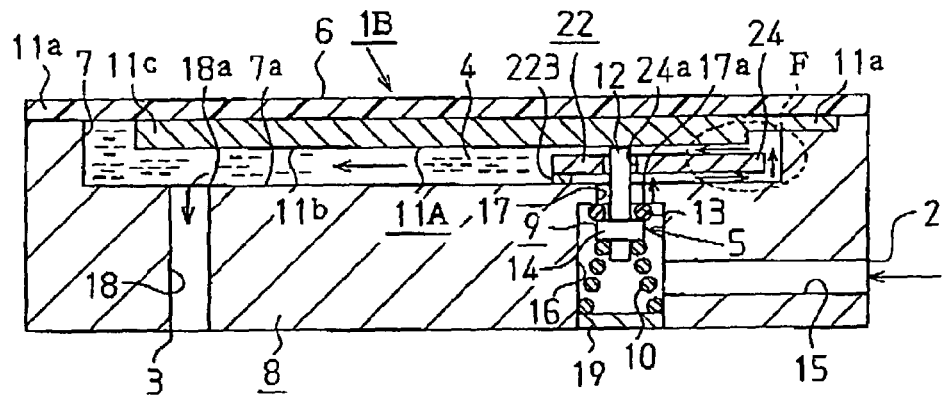
FIG. 32 is a cross-sectional view showing a valve device according to a fourteenth embodiment the present invention.

The valve device 1B according to a fourteenth embodiment will hereafter be explained with reference to FIG. 32. In FIG. 32, the valve device 1B is illustrated in a horizontally reversed manner with respect to the valve device 1 of FIG. 27. The difference between the valve device 1B and the twelfth embodiment is as follows.

In the valve device 1B, as shown in FIG. 32, a stopper plate 223 and a flow arrangement plate 24 are provided. The stopper plate 223 and the flow arrangement plate 24 each form the bubble discharge portion. The stopper plate 223 is arranged between the inlet opening 17a and the outlet opening 18a and on the bottom surface 7a of the groove-like passage 7. The stopper plate 223 stops the ink sent from the inlet opening 17a to the pressure chamber 4, reversing the ink flow toward the supported end 11a of the actuation lever 11A.

A through hole 24a through which the valve shaft 12 is passed is defined in the flow arrangement plate 24.

The fourteenth embodiment has the following advantage, in addition to the advantages of the twelfth embodiment.

After reaching the pressure chamber 4 from the inlet opening 17a, the ink is stopped by the stopper plate 223 in the pressure chamber 4 and flows in the space defined between the flow arrangement plate 24 and the bottom surface 7a of the groove like passage 7, thus reaching the supported end 11a of the actuation lever 11A. The ink then proceeds in the space defined between the flow arrangement plate 24 and the pressing surface (the lower surface) of the actuation lever 11A, reaching the outlet opening 18a. Accordingly, the bubbles retained in the vicinity of the supported end 11a (portion F of FIG. 32) is pressed by the ink at the supported end 11a of the actuation lever 11A, such that the bubbles are discharged to the liquid outlet 3. The bubble discharge performance of the valve device 1B is thus improved.

The valve device 1C according to a fifteenth embodiment of the present invention will be described with reference to FIGS. 33 to 35.

The valve device 1C is different from the twelfth embodiment in the following point.

Figure 33:
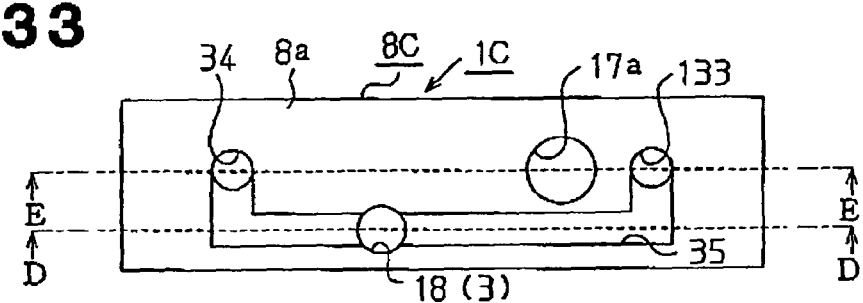
FIG. 33 is a plan view showing a valve device according to a fifteenth embodiment of the present invention, as viewed from the rear side.
Figure 34:
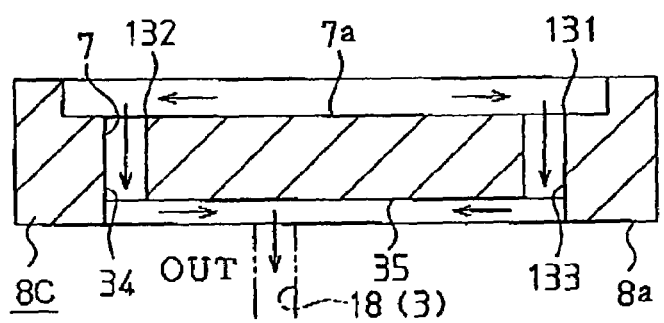
FIG. 34 is a cross-sectional view taken along line D-D of FIG. 33.
Figure 35:
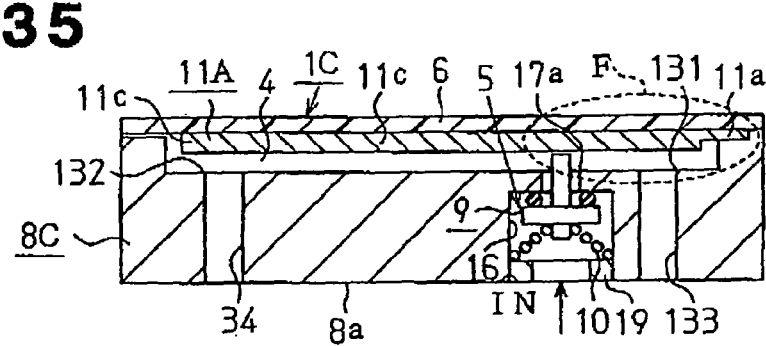
FIG. 35 is a cross-sectional view taken along line E-E of FIG. 33.

In the valve device 1C, as shown in FIGS. 33 to 35, the inlet opening 17a, a first outlet opening 131, and a second outlet opening 132 are provided. The inlet opening 17a is defined in the bottom surface 7a of the groove-like passage 7 and selectively opened or closed by the valve body 9. When the valve body 9 is located at the open position, the ink flows from the liquid inlet 2 to the pressure chamber 4 through the inlet opening 17a. The ink is sent from the vicinity of the supported end 11a of the actuation lever 11A in the groove-like passage 7 to the liquid outlet 3 through the first outlet opening 131. The ink is sent from the vicinity of the distal end 11c of the actuation lever 11A, opposed to the supported end 11a, in the groove-like passage 7 to the liquid outlet 3 through the second outlet opening 132.

The passage defining member 8C includes a first outlet passage 133, a second outlet passage 34, and a third passage 35, each of which serves as the bubble discharge portion. The first outlet passage 133 extends from the first outlet opening 131 to a lower surface 8a of the passage defining member 8C. The second outlet passage 34 extends from the second outlet opening 132 to the lower surface 8a. After the ink passes through the first and second outlet passages 133, 34, the third passage 35 guides the ink to the liquid outlet 3.

The fifteenth embodiment has the following advantage, in addition to the advantages of the twelfth embodiment.

After reaching the pressure chamber 4 from the inlet opening 17a, the ink flows to the supported end 11a of the actuation lever 11A in the pressure chamber 4. The ink is then introduced into the first outlet passage 133 from the first outlet opening 131 and then sent to the third passage 35. In the pressure chamber 4, the ink flows also to the vicinity of the distal end like of the actuation lever 11A, which is opposed to the supported end 11a. The ink is then sent from the second outlet opening 132 to the second outlet passage 34, thus flowing to the third passage 35. After reaching the third passage 35, the ink is sent to the liquid outlet 3 through the outlet passage 18. Accordingly, the ink passing the supported end 11a of the actuation lever 11A in the pressure chamber 4 moves the bubbles retained in the vicinity of the supported end 11a, such that the bubbles are discharged from the first outlet opening 131. The bubble discharge performance is thus enhanced.

The bubbles are discharged through the first outlet passage 133, the second outlet passage 34, and the third passage 35, which are provided separately in the passage defining member 8C. The bubble discharge is thus performed stably.

Figure 36:
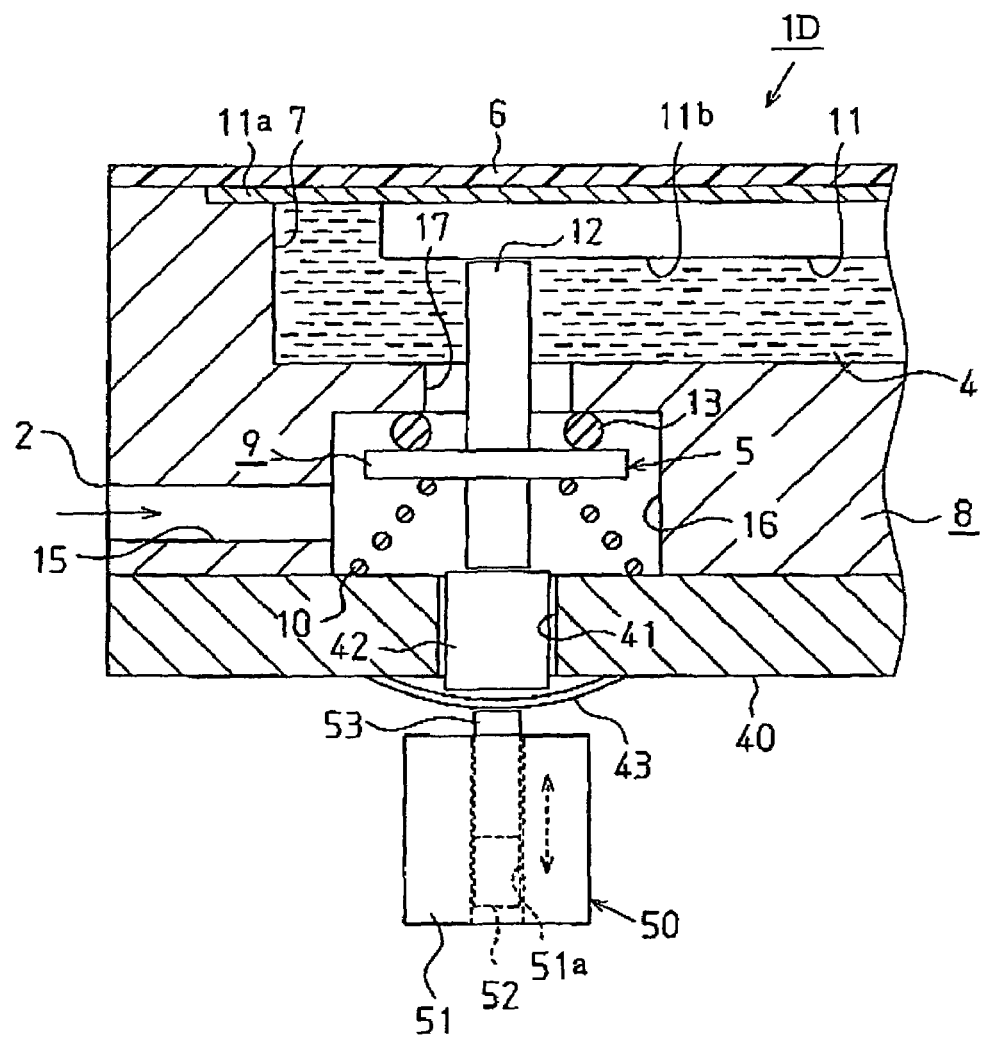
FIG. 36 is a cross-sectional view showing a valve device according to a sixteenth embodiment the present invention.

The valve device 1D according to a sixteenth embodiment of the present invention will be explained referring to FIG. 36.

The valve device 1D is characterized by the configuration in which the pressure regulator 5 of the twelfth embodiment, which is shown in FIG. 27, functions as a choke valve.

The invention may be modified in the following modified forms.

The valve body 9 of the twelfth to fifteenth embodiments may be modified to the L-shaped valve body shown in FIGS. 5 to 10.

Figure 37:
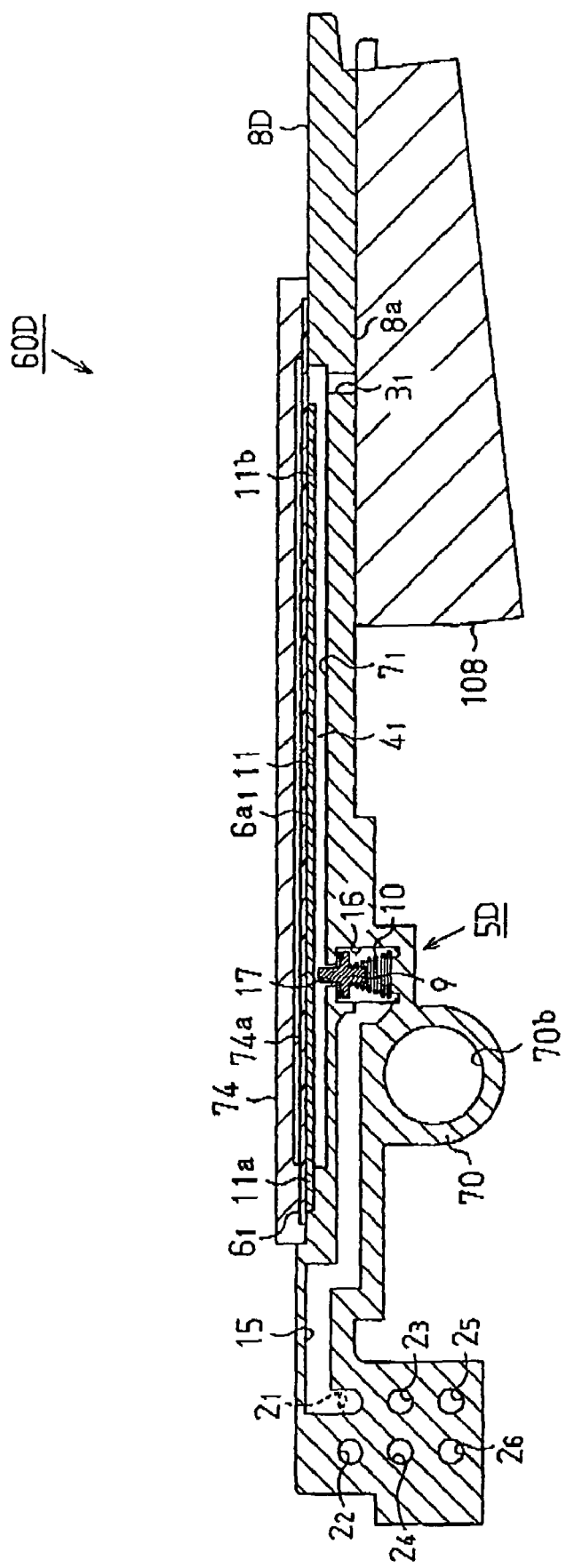
FIG. 37 is a lateral cross-sectional view showing a carriage according to a seventeenth embodiment of the present invention.
Figure 38:
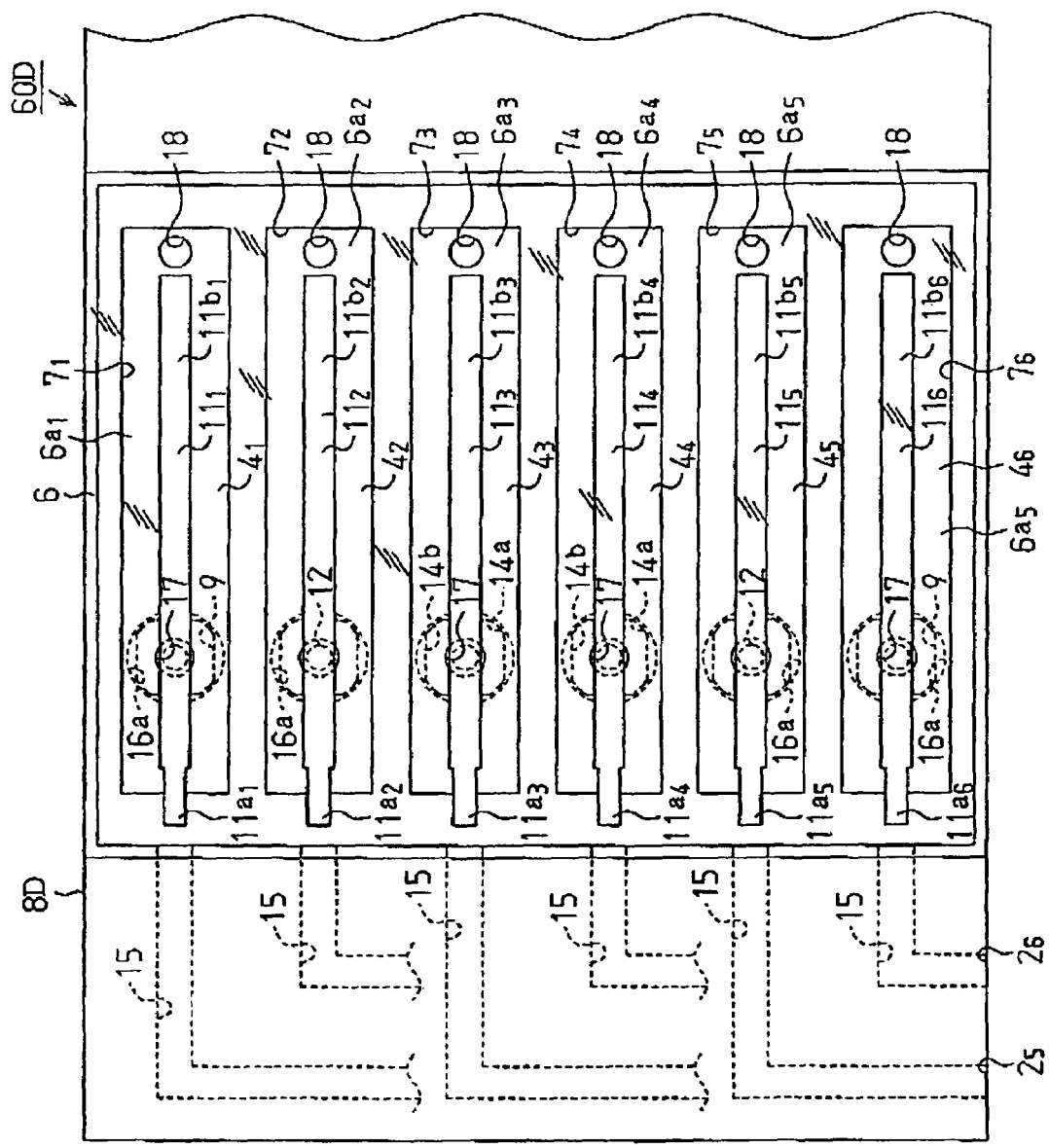
FIG. 38 is a plan view showing a main portion of the carriage of FIG. 37.

A seventeenth embodiment of the present invention will hereafter be described. As shown in FIG. 37, the passage defining member 8D, which serves as a carriage body of a carriage 60D, is formed by a substantially rectangular plate member. Referring to FIG. 38, the six groove-like passages $7_1$ to $7_6$ are defined in the upper surface of the passage defining member 8. Each of the groove-like passages $7_1$ to $7_6$ serves as a passage for ink as liquid and, as shown in FIG. 38, is formed in a rectangular shape as viewed along the horizontal plane.

As illustrated in FIG. 37, actuation levers $11_1$ to $11_6$, each of which forms part of a deforming portion, are each arranged in (an upper section of) the opening defined by the corresponding one of the groove-like passages $7_1$ to $7_6$.

As shown in FIG. 37, the film protecting plate 74 is disposed on the film member 6. The film protecting plate 74 is formed by a rectangular plate member having an outline slightly larger than that of the film member 6, as illustrated in the drawing. An outer circumferential portion of the film member 6 is secured to the passage defining member 8D by the film protecting plate 74. A recess 74a is defined in the lower surface of the film protecting plate 74 at a position opposed to the pressure receiving portions $6a_1$ to $6a_6$. The recess 74a has a rectangular shape as viewed from above and permits the film member 6 to elastically deform in an upward direction. In FIG. 38, which explains the interior structure of each pressure chamber $4_1$ to $4_6$, the film protecting plate 74 is omitted for the purposes of illustration.

As shown in FIGS. 37 and 38, the communication hole 17 serving as the inlet port and the outlet passage 18 serving as the outlet port are defined in the opposing longitudinal ends of the bottom surface of each groove-like passage $7_1$ to $7_6$. With reference to FIG. 37, each communication hole 17 extends downward from the bottom surface of the corresponding pressure chamber $4_1$ to $4_6$ for introducing the ink into the pressure chamber $4_1$ to $4_6$. As shown in the drawing, the pressure regulator 5D is disposed below each of the groove-like passages $7_1$ to $7_6$. In other words, six pressure regulators 5D are arranged below the corresponding communication holes 17 in correspondence with the pressure chambers $4_1$ to $4_6$. Referring to FIG. 37, each outlet passage 18 is defined by a circular hole extending from the bottom surface of the corresponding pressure chamber $4_1$ to $4_6$ to the lower surface 8a of the passage defining member 8, through which the ink is discharged from the pressure chamber $4_1$ to $4_6$. The recording head 108 is located below the outlet passages 18.

Figure 39:
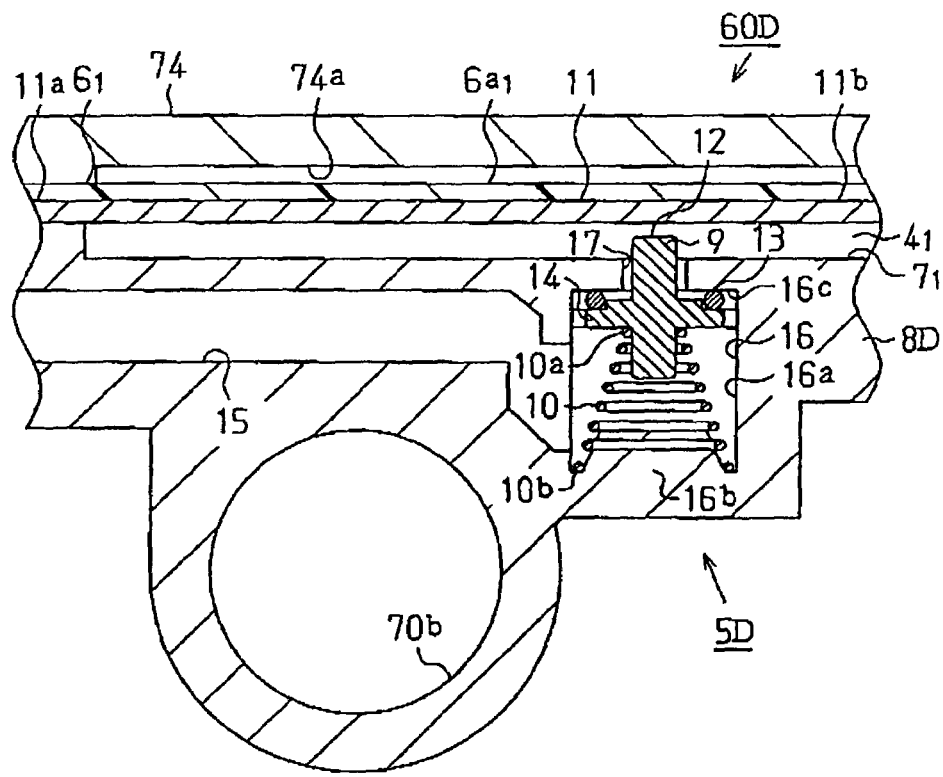
FIG. 39 is a lateral cross-sectional view showing a main portion of the carriage of FIG. 37.
Figure 40:
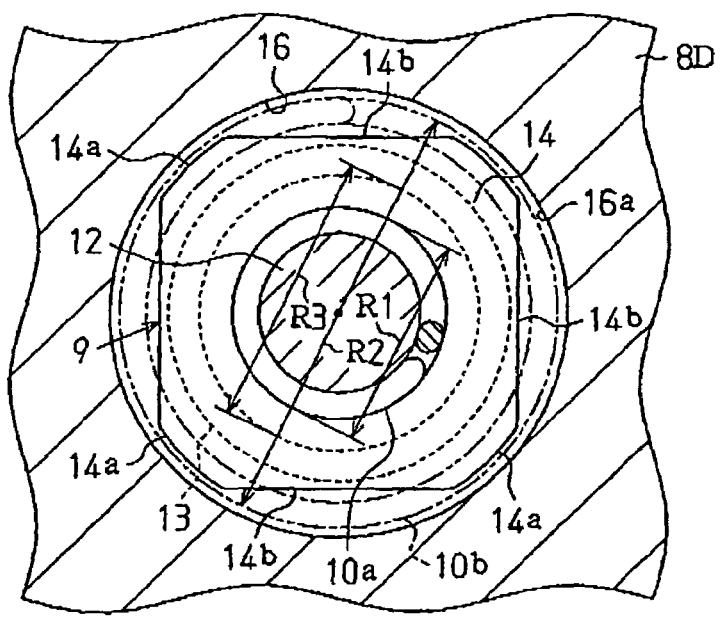
FIG. 40 is a cross-sectional plan view showing a pressure regulator of FIG. 37.

The pressure regulator 5D will now be described with reference to FIGS. 39 and 40. FIG. 39 is a cross-sectional side view showing a main portion of the carriage 60D and FIG. 40 is a cross-sectional plan view showing a main portion of the pressure regulator 5D.

As shown in FIG. 39, each pressure regulator 5D includes the liquid supply chamber 16 serving as a valve body accommodating passage, the pressure adjustment spring 10 forming a holding portion, the valve body 9, and an O ring 13 serving as a seal portion.

Referring to FIG. 39, the liquid supply chamber 16 corresponds to a circular chamber extending downward from each communication hole 17 in an enlarged manner. As illustrated in the drawing, an inlet passage 15 serving as a communication passage is defined in an inner circumferential surface 16a of the liquid supply chamber 16. Each of the inlet passages 15 is an ink passage defined in the passage defining member 8D and connected to the corresponding liquid inlets $2_1$ to $2_6$ (see FIG. 37), each serving as a communication port defined in a side surface of the passage defining member 8D. Each of the liquid inlets $2_1$ to $2_6$, connects the passage defining member 8D to the ink cartridges 109, 110 (see FIG. 41), the liquid supply portions, through tubes. After being sent from the ink cartridges 109, 110, the ink flows from the liquid inlet $2_1$ to $2_6$ to the inlet passage 15 and then to the liquid supply chamber 16. That is, the passage defining member 8D includes six inlet passages 15 and six liquid inlets $2_1$ to $2_6$, in correspondence with the number of the pressure regulators 5D.

A positioning projection 16b projects from the bottom of each liquid supply chamber 16, as shown in FIG. 39. The positioning projection 16b has a truncated cone-like shape. The diameter of the lower end of the positioning projection 16b is slightly smaller than the inner diameter of the liquid supply chamber 16, referring to FIG. 39.

With reference to FIG. 39, the pressure adjustment spring 10 is secured to the positioning projection 16b. The pressure adjustment spring 10 is a cone-shaped coil spring as shown in the drawing. The pressure adjustment spring 10 is arranged such that an end with a relatively short outer coil diameter (coil diameter), or an upper end portion 10a, is located above an end with a relatively large coil diameter, or a lower end portion 10b. The coil diameter of the upper end portion 10a (upper end coil diameter R1) is substantially equal to the inner diameter of the communication hole 17, as illustrated in FIGS. 39 and 40. The coil diameter of the lower end portion 10b (lower-end coil diameter R2) is substantially equal to the inner diameter of the liquid supply chamber 16. As shown in FIG. 39, the pressure adjustment spring 10 is positioned with respect to the horizontal direction of the liquid supply chamber 16 by engaging the positioning spring 16b with the inner circumference of the power end portion 10b.

The valve body 9 is arranged between the upper end portion 10a of the pressure adjustment spring 10 and an upper surface 16c of the liquid supply chamber 16 (an outer circumferential portion of the communication hole 17). The valve body 9 includes the valve shaft 12 and the jaw 14 serving as a spring receiving portion.

With reference to FIGS. 39 and 40, the valve shaft 12 is defined by a columnar shaft. The outer diameter of the valve shaft 12 is shorter than the inner diameter of the communication hole 17 (the upper-end coil diameter R1). As shown in FIG. 39, the opposing, upper and lower ends of the valve shaft 12 are inserted into the communication hole 17 and the upper end portion 10a of the pressure adjustment spring 10, respectively, such that the valve body 9 is allowed to move upward or downward. The ink in the liquid supply chamber 16 is introduced into the pressure chamber $4_1$ to $4_6$ through the space between the valve shaft 12 and the wall of the communication hole 17.

Referring to FIGS. 39 and 40, the jaw 14 is formed at an intermediate portion of the valve shaft 12 in a substantially square shape as viewed along the horizontal plane. As shown in FIG. 39, the jaw 14 extends perpendicular to the valve shaft 12 and is located between the upper end portion 10a and the upper surface 16c. As shown in FIG. 40, the outer circumferential surface of the jaw 14 includes sliding surfaces 14a, which slide along the inner circumferential surface 16a, and cutaway surfaces 14b. The cutaway surfaces 14b are formed by cutting sections of the sliding surfaces 14a at equal angular intervals such that the cutaway surfaces 14b are spaced from the inner circumferential surface 16a. The jaw 14 receives the pressing force of the pressure adjustment spring 10 contacting the lower surface of the jaw 14, thus urging the valve body 9 toward the upper surface 16c constantly. The sliding surfaces 14a of the jaw 14 slide along the inner circumferential surface 16a, such that the valve body 9 is permitted to move only along the upward or downward direction of the circumferential surface 16a. The ink is sent from below the jaw 14 to the communication hole 17 through the gaps between the cutaway surfaces 14b and the inner circumferential surface 16a.

As shown in FIG. 39, the O ring 13 is secured to the upper surface of the jaw 14 (opposed to the upper surface 16c) As illustrated in FIG. 40, the O ring 13 is located closer to the axis of the valve shaft 12 than the cutaway surfaces 14b. The O ring 13 has an O-ring diameter R3, which is larger than the upper-end coil diameter R1. As viewed along the horizontal plane, the upper end portion l0a of the pressure adjustment spring 10 is located radially inward from the O ring 13.

As long as the valve body 9, which is urged by the pressure adjustment spring 10 toward the upper surface 16c, is free from force reactive to the pressing force of the pressure adjustment spring 10, the valve body 9 is maintained at the position at which the jaw 14 and the upper surface 16c are held in tight contact with the O ring 13 (the closed position). More specifically, the valve body 9 is held at the closed position for blocking the ink supply to the pressure chambers $4_1$ to $4_6$, unless the valve body 9 receives the aforementioned reactive force. With the valve body 9 held at the closed position, as shown in FIG. 39, the upper end of the valve shaft 12 constantly projects upward with respect to the bottom surface of the corresponding groove-like passage $7_1$ to $7_6$.

When the ink supply is shuttered by the valve body 9, the pressure in the pressure chamber $4_1$ to $4_6$ is decreased to a predetermined level (for example, a minimum pressure at which the recording head 108 is prevented from causing an ink ejection problem) due to the ink consumption by the recording head 108. In this state, the pressure receiving portion $6a_1$ to $6a_6$ is elastically deformed in a downward direction of the pressure chamber $4_1$ to $4_6$, thus lowering the pressing portion $11b_1$ to $11b_6$. The pressing portion $11b_1$ to $11b_6$ thus presses the valve shaft 12 with a leverage effect. That is, the pressing portion $11b_1$ to $11b_6$, which opposes the valve shaft 12, lowers the upper end of the valve shaft 12 by actuation force greater than the pressing force of the film member 6. More specifically, when the pressure in the pressure chamber $4_1$ to $4_6$ is lowered to the predetermined level, the valve body 9 is moved from the closed position to the position at which the O ring 13 is spaced from the upper surface 16c (the open position), such that the ink supply to the pressure chamber $4_1$ to $4_6$ is permitted.

When the ink is supplied to the pressure chamber $4_1$ to $4_6$, the pressure in the pressure chamber $4_1$ to $4_6$ is raised from the predetermined level. When the pressure in the pressure chamber $4_1$ to $4_6$ is increased, the pressure receiving portion $6a_1$ to $6a_6$ elastically restores the original shape in an upward direction of the pressure chamber $4_1$ to $4_6$. In this manner, the pressing portion $11b_1$ to $11b_6$ is raised. In this state, the pressing portion $11b_1$ to $11b_6$, which opposes the valve shaft 12, is separated from the upper end of the valve shaft 12, thus releasing the actuation force. In other words, when the ink is sent to the pressure chamber $4_1$ to $4_6$, the valve body 9 is returned from the open position to the closed position, such that the ink supply to the pressure chamber $4_1$ to $4_6$ is shuttered.

The upper end portion 10a having the upper-end coil diameter R1 smaller than the O-ring diameter R3 urges the valve body 9 toward the upper surface 16c at a position close to the center of the O ring 13, which opposes the upper end portion 110a through the jaw 14. That is, the valve body 9 at the closed position receives the pressing force of the pressure adjustment spring 10 with the power point corresponding to the portion relatively close to the center of the O ring 13, or the fulcrum. In this manner, the jaw 14 of the valve body 9 is placed in tight contact with the O ring 13 along the entire circumference.

Figure 41:
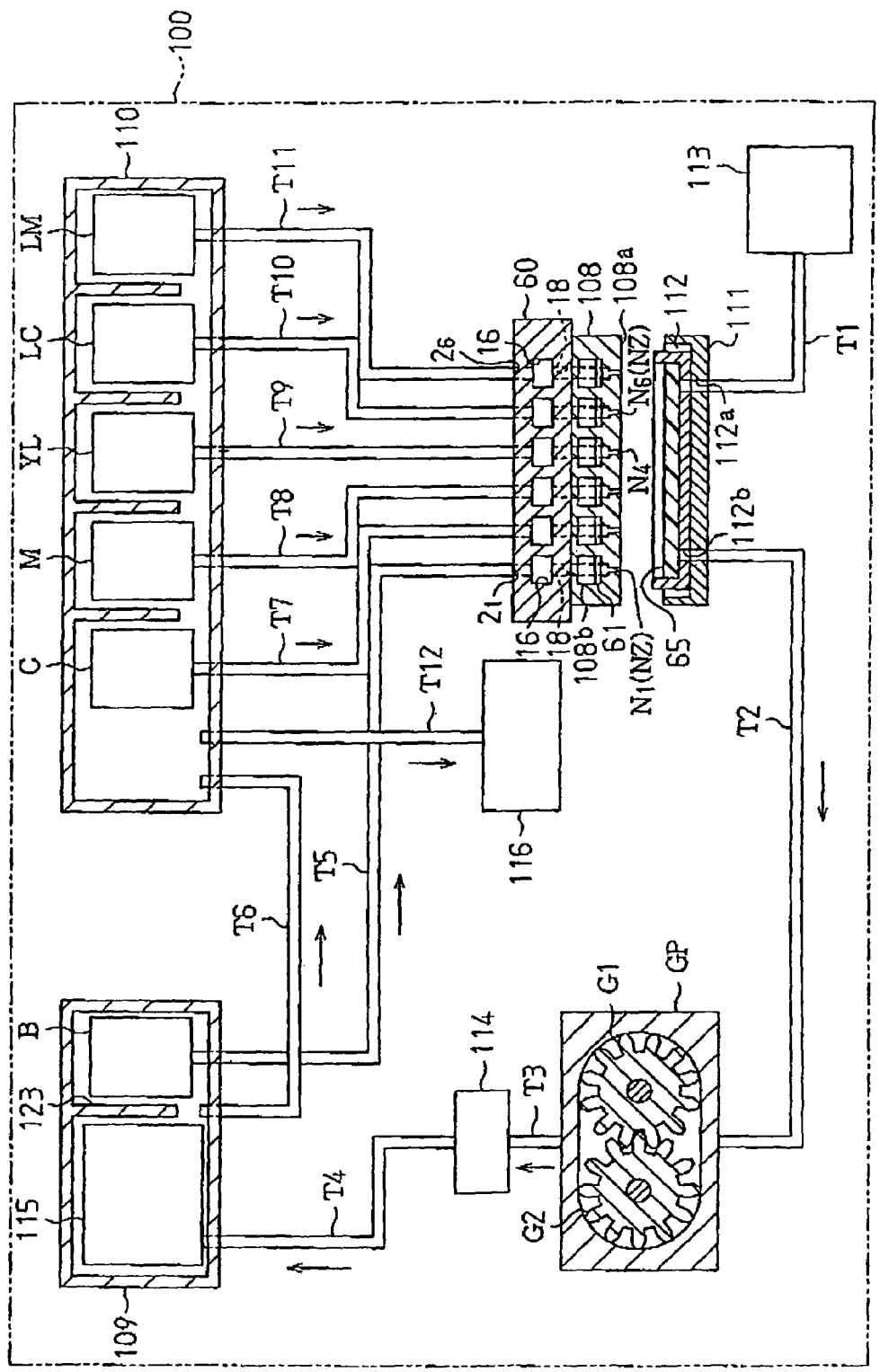
FIG. 41 is a view explaining an ink passage of an inkjet type printer according to the present invention.

As shown in FIG. 41, an oscillation plate 61 and a piezoelectric element 108b above each of the nozzles NZ.

The oscillation plate 61 is formed by a plate-like material and oscillation in correspondence with operation of the piezoelectric element 108b. In accordance with an image signal generated based on printing image data, the piezoelectric element 108b is extended or compressed in an elongated direction, along the direction in which the ink is ejected. When the image signal is inputted to the piezoelectric element 108b, the oscillation plate 61 is oscillated in correspondence with the extension or compression of the piezoelectric element 108b. Accordingly, the volume of the nozzle NZ is increased or decreased. If the volume of the nozzle NZ is decreased, the ink in the nozzle NZ is ejected as ink drops. If the volume of the nozzle NZ is increased, negative pressure is produced in the nozzle NZ. The negative pressure causes the color ink corresponding to the nozzle NZ to be supplied to the nozzled NZ.

The printer 100 feeds the recording paper along the sub scanning direction Y and reciprocates the carriage 60D along the main scanning direction X.

As illustrated in FIG. 41, an absorbing body 65 for absorbing the ink is securely fitted into the space defined by the cap member 112. The absorbing body 65 is configured by, for example, a sponge sheet, or formed of a porous material.

In correspondence with the reciprocal movement of the valve body 9 between the closed position and the open position, the pressure regular 5D reduces the pressure of the ink fed from the carriage 60D to the recording head 108 to a predetermined level. In this manner, the pressure regulator 5D avoids an excessive pressure rise, which causes an ink ejection problem.

The illustrated embodiment has the following advantages.

(1) The upper end portion 10a, which has the upper-end coil diameter R1 smaller than the O-ring diameter R3, urges the valve body 9 toward the upper surface 16c at the position close to the center of the O ring 13. Thus, the jaw 14 of the valve body 9 located at the closed position is placed in tight contact with the O ring 13 along the entire circumference. This reliably blocks the ink supply to the pressure chamber $4_1$ to $4_6$. Accordingly, the pressure regulator 5D reliably controls the ink supply to the pressure chamber $4_1$ to $4_6$ and the ink discharge therefrom, thus improving the stability of the pressure adjustment by the carriage 60D.

(2) In the illustrated embodiment, the lower end portion 110b having the lower-end coil diameter R2 larger than the upper-end coil diameter R1 is positioned by the positioning projection 16b as the basal end of the pressure adjustment spring 10. Therefore, regardless of that the valve body 9 is urged by the upper end portion 10a with the upper-end coil diameter R1 smaller than the O-ring diameter R3, the pressure adjustment spring 10 is prevented from becoming buckled or displacing to an offset position. As a result, the reciprocal movement of the valve body 9 (the O ring 13) between the open position and the closed position is further stabilized, such that the pressure adjustment by the carriage 60D is accomplished with improved stability.

(3) The sliding surfaces 14a each sliding along the inner circumferential surface 16a are formed along the outer circumference of the valve body 9 (the jaw 14). The reciprocal movement of the valve body 9 is thus guided along the inner circumferential surface 16a. This reliably prevents the valve body 9 from being moved to an offset position.

(4) The cutaway surfaces 14b spaced from the inner circumferential surface 16a is provided along the outer circumference of the valve body 9 (the jaw 14). This structure reduces the sliding load of the valve body 9 with respect to the inner circumferential surface 16a. Further, the gaps between the inner circumferential surface 16a and the cutaway surfaces 14b decrease the flow resistance in the liquid supply chamber 16. As a result, the reciprocal movement of the valve body 9 becomes further smooth and the pressure adjustment by the carriage 60D is accomplished with improved stability.

The illustrated embodiment may be modified as follows.

In the illustrated embodiment, the pressure adjustment spring 10 has a cone shape. However, the pressure adjustment spring 10 may be formed in a barrel-like shape. As long as the pressure adjustment spring 10 contacts the valve body 9 at a position radially inward from the O ring 13 and urges the valve body 9 toward the closed position, any suitable structure may be employed.

Although the number of the cutaway surfaces 14b formed at regular angular intervals is four in the illustrated embodiment, such number may be, for example, one. As long as a surface spaced from the inner circumferential surface 16a is formed along the outer circumferential surface of the jaw 14, any suitable structure may be employed.

In the illustrated embodiment, the O ring 13 is secured to the jaw 14 of the valve body 9. However, the O ring 13 may be secured to, for example, the upper surface 16c of the liquid supply chamber 16. As long as the O ring 13 is located such that the O ring 13 is allowed to be placed in tight contact with the jaw 14 and the upper surface 16c, any suitable arrangement may be employed.

In the illustrated embodiment, the cutaway surfaces 14b are formed along the outer circumferential surface of the jaw 14. However, cutaway portions may be formed along the inner circumferential surface 16a, along the vertical direction. As long as a gap through which the ink is passed is defined between the inner circumferential surface 16a and the jaw 14, any suitable structure may be selected.

Although only some embodiments of the present invention have been described herein, it should be clear to those skilled in the art that the invention may be embodied in other particular forms without departing from the spirit of the invention. The present invention is not to be restricted to the above description but may be modified within the scope of the attached claims.

The invention claimed is:

1. A valve device having a pressure chamber connected to a liquid inlet and a liquid outlet for retaining liquid and a pressure regulator decreasing the pressure in the pressure chamber to a predetermined level, wherein:

the pressure regulator has a pressure receiving member, the pressure receiving member being elastically deformed in an inward direction of the pressure chamber when the pressure in the pressure chamber becomes lower than the predetermined level, the pressure regulator generating actuation force greater than pressing force produced by the elastic deformation of the pressure receiving member, the pressure regulator being configured to be opened by the actuation force, a fluid supply from the liquid inlet to the pressure chamber being permitted when the pressure regulator is opened, wherein the valve device includes a pressing member generating the actuation force by receiving the pressing force, wherein the pressing member functions as a cantilever.

2. The valve device according to claim 1, wherein the pressing member forms a force amplification mechanism for amplifying the pressing force to the actuation force.

3. The valve device according to claim 2, wherein the pressing member forms a leverage mechanism for generating the actuation force by receiving the pressing force.

4. The valve device according to claim 1, the valve device further including a passage defining member including a groove-like passage connected to the liquid inlet and the liquid outlet, the pressure receiving member defining the pressure chamber by sealing the groove-like passage, wherein the pressure regulator includes:
a valve body movable between an open position for connecting the liquid inlet to the groove-like passage and a closed position for disconnecting the liquid inlet from the groove-like passage;
wherein, when receiving the pressing force, the pressing member transmits the actuation force to the valve body for moving the valve body to the open position.

5. The valve device according to claim 4, wherein the pressure regulator further includes a pressure adjustment spring for urging the valve body toward the closed position, the pressing member urging the valve body toward the open position against the urging force of the pressure adjustment spring.

6. The valve device according to claim 4, wherein:
the pressing member includes an actuation lever arranged in the groove-like passage and functioning as the cantilever, the actuation lever having a supported end supported by the passage defining member; and
the valve body is located such that the valve body receives the actuation force from a portion of the actuation lever closer to the supported end than the center of gravity of the actuation lever.

7. The valve device according to claim 6, wherein the actuation lever includes a distal end opposed to the supported end, the actuation lever receiving the pressing force over a portion from the supported end to the distal end.

8. The valve device according to claim 6, wherein the actuation lever includes a pressing portion for contacting and pressing the valve body, the supported end having rigidity lower than that of the pressing portion.

9. The valve device according to claim 8, wherein the actuation lever is formed by a plate, the pressing portion having a channel-like cross-sectional shape.

10. The valve device according to claim 5, wherein:
the valve body includes a valve shaft and a seal portion; and
the passage defining member includes:
an inlet passage including the liquid inlet;
a liquid supply chamber connected to the inlet passage and accommodating the valve body and the pressure adjustment spring;
a communication hole connecting the liquid supply chamber to the pressure chamber, the valve shaft being passed through the communication hole with a gap defined between the valve shaft and a circumferential surface of the communication hole; and
a seal surface opposed to the seal portion along the circumference of the communication hole, the pressure adjustment spring pressing the seal portion against the seal surface.

11. The valve device according to claim 10 wherein:
the liquid supply chamber includes an opening at a position opposed to the communication hole;
the passage defining member further includes a holding member for sealing the opening of the liquid supply chamber; and
the pressure adjustment spring is arranged between the valve body and the holding member.

12. The valve device according to claim 5, wherein:
the valve body is substantially an L-shaped lever, the L-shaped lever being rotatably supported by the passage defining member in the groove-like passage, the L-shaped lever having a first lever section including a seal portion and a second lever section pressed by the pressing member, the first lever section being formed integrally with the second lever section, the L-shaped lever being urged by the pressure adjustment spring toward the closed position.

13. The valve device according to claim 4, wherein the groove-like passage is one of a plurality of groove-like passages retaining different types of liquid, the groove-like passages being aligned in parallel.

14. The valve device according to claim 1 further including a choke valve function capable of forcibly maintaining the pressure regulator at the closed position.

15. The valve device according to claim 6 further including a bubble discharge portion for introducing at least some of the liquid supplied from the liquid inlet to the pressure chamber to the vicinity of the supported end of the actuation lever in the pressure chamber.

16. The valve device according to claim 15, wherein:
the actuation lever is formed by a plate, the actuation lever having a pressing portion for pressing the valve body, the pressing portion having a channel-like cross-sectional shape;
an inlet opening and an outlet opening are defined in a bottom surface of the groove-like passage, the inlet opening being selectively opened or closed by the valve body, the liquid flowing from the liquid inlet to the pressure chamber through the inlet opening when the valve body is placed at the open position, the outlet opening permitting the liquid to flow from the pressure chamber to the liquid outlet; and
the bubble discharge portion includes a shutter body arranged between the inlet opening and the outlet opening on the bottom surface of the groove-like passage, the shutter body stopping the liquid passing through the space defined by the pressing portion after flowing from the inlet opening to the pressure chamber, such that the liquid flow is directed toward the supported end of the actuation lever.

17. The valve device according to claim 15, wherein:
the actuation lever has a pressing portion for pressing the valve body, the pressing portion including a flat pressing surface, the pressing portion being configured to have rigidity higher than that of the supported end;
an inlet opening and an outlet opening are defined in a bottom surface of the groove-like passage, the inlet opening being selectively opened or closed by the valve body, the liquid flowing from the liquid inlet to the pressure chamber through the inlet opening when the valve body is placed at the open position, the outlet opening permitting the liquid to flow from the pressure chamber to the liquid outlet; and
the bubble discharge portion includes a passage defining body arranged on the bottom surface of the groove-like passage, the passage defining body defining a first passage for guiding the liquid sent from the inlet opening to the pressure chamber to the supported end of the actuation lever, as well as a second passage for guiding the liquid sent to the supported end by the first passage to the outlet opening.

18. The valve device according to claim 15, wherein:
the actuation lever has a pressing portion for pressing the valve body, the pressing portion including a flat pressing surface, the pressing portion being configured to have rigidity higher than that of the supported end;
an inlet opening and an outlet opening are defined in a bottom surface of the groove-like passage, the inlet opening being selectively opened or closed by the valve body, the liquid flowing from the liquid inlet to the pressure chamber through the inlet opening when the valve body is placed at the open position, the outlet opening permitting the liquid to flow from the pressure chamber to the liquid outlet; and
the bubble discharge portion has a stopper plate and a flow arrangement plate arranged on the bottom surface of the groove-like passage, the stopper plate being located between the inlet opening and the outlet opening, wherein:
the stopper plate stops the liquid flowing from the inlet opening to the pressure chamber and thus directs the liquid flow to the supported end of the actuation lever, and
the flow arrangement plate defines a first line extending between the flow arrangement plate and the bottom surface of the groove-like passage and a second line extending between the flow arrangement plate and the pressing surface of the actuation lever, the liquid directed to the supported end of the actuation lever by the stopper plate being guided to the supported end through the first line, the liquid guided to the supported end being guided to the outlet opening through the second line.

19. The valve device according to claim 15, wherein:
the actuation lever has a pressing portion for pressing the valve body, the pressing portion being configured to have rigidity higher than that of the supported end;
an inlet opening, a first outlet opening, and a second outlet opening are defined in the bottom surface of the groove-like passage, the inlet opening being selectively opened or closed by the valve body and permitting a liquid flow from the liquid inlet to the pressure chamber when the valve body is placed at the open position, the first outlet opening permitting a liquid flow from a portion of the groove-like passage corresponding to the supported end of the actuation lever to the liquid outlet, the second outlet opening permitting a liquid flow from a portion of the groove-like passage opposed to the supported end to the liquid outlet; and
the bubble discharge portion includes a first outlet passage including the first outlet opening and defined in the passage defining member, a second outlet passage including the second outlet opening and defined in the passage defining member, and a third passage defined in the passage defining member for connecting the first and second outlet passages to the liquid outlet.

20. The valve device according to claim 4, wherein the pressure receiving member is a film member, the film member being sufficiently thin for being elastically deformable due to a pressure change in the pressure chamber, the film member being secured to the passage defining member as held in a dome-like bent shape projecting outward from the pressure chamber.

21. the valve device according to claim 20, wherein the film member is formed of polyphenylene sulfide, the film member having a thickness of 10 μm or smaller.

22. The valve device according to claim 5, wherein the pressure adjustment spring is a cone-shaped coil spring, the coil spring having a first end capable of contacting the valve body and a second end opposed to the first end, a coil diameter at the second end being larger than that at the first end.

23. The valve device according to claim 22, wherein:
the passage defining member includes a liquid supply chamber connected to the liquid inlet and accommodating the valve body and the pressure adjustment spring and a communication hole connecting the liquid supply chamber to the pressure chamber;
the valve body has a jaw capable of closing the communication hole and an annular seal portion arranged at a portion of the jaw opposed to an outer circumferential portion of the communication hole; and
the first end of the coil spring contacts a portion of the jaw opposed to the communication hole, the first end being located radially inward from the annular seal portion.

24. The valve device according to claim 22, wherein:
the passage defining member includes a liquid supply chamber connected to the liquid inlet and accommodating the valve body and the pressure adjustment spring and a communication hole connecting the liquid supply chamber to the pressure chamber;
the valve body has a jaw capable of closing the communication hole and an annular seal portion arranged at a portion of the jaw facing an outer circumferential portion of the communication hole; and
a coil diameter at the first end of the coil spring is equal to or smaller than an inner diameter of the annular seal portion.

25. The valve device according to claim 22, wherein:
the passage defining member includes a liquid supply chamber connected to the liquid inlet and accommodating the valve body and the pressure adjustment spring, the liquid supply chamber having an inner circumferential surface, and a communication hole connecting the liquid supply chamber to the pressure chamber; and
the valve body has a jaw capable of closing the communication hole, wherein the jaw includes a sliding surface slidable along an inner circumferential surface of the liquid supply chamber and a cutaway surface defining a gap with respect to the inner circumferential surface of the liquid supply chamber.

26. A carriage comprising:
a pressure chamber connected to a liquid inlet and a liquid outlet for retaining liquid;
a pressure regulator decreasing the pressure of the liquid in the pressure chamber to a predetermined level; and
a liquid ejection head; wherein:
the pressure regulator has a pressure receiving member, the pressure receiving member being elastically deformed in an inward direction of the pressure chamber when the pressure in the pressure chamber becomes lower than the predetermined level, the pressure regulator generating actuation force greater than pressing force produced by the elastic deformation of the pressure receiving member, the pressure regulator being configured to be opened by the actuation force, a fluid supply from the liquid inlet to the pressure chamber being permitted when the pressure regulator is opened,
wherein the carriage includes a pressing member generating the actuation force by receiving the pressing force, wherein the pressing member functions as a cantilever.

27. The carriage according to claim 26, wherein the pressure regulator includes:
- a passage defining member having a groove-like passage connected to the liquid inlet and the liquid outlet, the groove-like passage being sealed by a film member serving as the pressure receiving member such that the pressure chamber is defined;
- a valve body movable between an open position for connecting the liquid inlet to the groove-like passage and a closed position for disconnecting the liquid inlet from the groove-like passage; and
- a pressure adjustment spring for urging the valve body toward the closed position;
- the pressing member transmitting the actuation force to the valve body and thus moving the valve body toward the open position when receiving the pressing force.

28. The carriage according to claim 27, wherein:
- the pressing member is an actuation lever arranged in the groove-like passage, the actuation lever having a supported end supported by the passage defining member; and
- the valve body is located such that the valve body receives the actuation force from the actuation lever at a portion of the actuation lever closer to the supported end than the center of gravity of the actuation lever.

29. The carriage according to claim 27, wherein the pressure regulator is one of a plurality of pressure regulators, the groove-like passage being one of a plurality of groove-like passages retaining different types of liquid, the groove-like passages being aligned in parallel, the pressure regulators being arranged in parallel.

30. The carriage according to claim 27 further including a spring receiving member bonded with the passage defining member, the spring receiving member holding the pressure adjustment spring together with the passage defining member, the spring receiving member having a bearing portion that can be engaged with a guide shaft for guiding the carriage in a reciprocally movable manner.

31. The carriage according to claim 27, wherein the passage defining member includes the liquid outlet, the liquid outlet being capable of connecting directly to the liquid ejection head.

32. The carriage according to claim 30 further including a passage plate provided separately from the spring receiving member, wherein the passage defining member includes the liquid outlet, and wherein the passage plate includes a passage capable of connecting the liquid outlet to the liquid ejection head.

33. The carriage according to claim 30 further including a passage plate provided integrally with the spring receiving member, wherein the passage defining member includes the liquid outlet, and wherein the passage plate includes a passage capable of connecting the liquid outlet to the liquid ejection head.

34. the valve device according to claim 1,
further comprising a valve body to close the liquid inlet,
the pressing member having a supported end and a distal end, the distal end being a free end opposed to the supported end,
the valve body is located such that the valve body receives the actuation force from a portion of the pressing member between the supported end and the distal end.

35. The carriage according to claim 26,
further comprising a valve body to close the liquid inlet,
the pressing member having a supported end and a distal end, the distal end being a free end opposed to the supported end,
the valve body is located such that the valve body receives the actuation force from a portion of the pressing member between the supported end and the distal end.

36. A valve device having a pressure chamber connected to a liquid inlet and a liquid outlet for retaining liquid and a pressure regulator decreasing the pressure in the pressure chamber to a predetermined level, wherein:
- the pressure regulator has a pressure receiving member, the pressure receiving member being elastically deformed in an inward direction of the pressure chamber when the pressure in the pressure chamber becomes lower than the predetermined level, the pressure regulator generating actuation force greater than a pressing force produced by the elastic deformation of the pressure receiving member, the pressure regulator being configured to be opened by the actuation force, a fluid supply from the liquid inlet to the pressure chamber being permitted when the pressure regulator is opened,
- the valve device including a pressing member generating the actuation force by receiving the pressing force,
- the pressure regulator including a valve body to close the liquid inlet,
- the pressing member being formed by a plate, the pressing member including a pressing portion for contacting and pressing the valve body, and the pressing portion having a channel-like cross-sectional shape.

* * * * *